United States Patent
Bamba

(10) Patent No.: US 9,287,969 B2
(45) Date of Patent: Mar. 15, 2016

(54) PROTECTION CHANNEL PROVISIONING METHOD AND NODE EQUIPMENT

(71) Applicant: FUJITSU LIMITED, Kawasaki-shi, Kanagawa (JP)

(72) Inventor: Masakazu Bamba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 14/254,151

(22) Filed: Apr. 16, 2014

(65) Prior Publication Data

US 2014/0341560 A1    Nov. 20, 2014

(30) Foreign Application Priority Data

May 17, 2013  (JP) ................................. 2013-105576

(51) Int. Cl.

| | |
|---|---|
| H04B 10/032 | (2013.01) |
| H04Q 11/00 | (2006.01) |
| H04J 14/02 | (2006.01) |
| H04L 12/911 | (2013.01) |
| H04L 12/913 | (2013.01) |

(52) U.S. Cl.
CPC .......... *H04B 10/032* (2013.01); *H04J 14/0291* (2013.01); *H04L 47/72* (2013.01); *H04L 47/724* (2013.01); *H04L 47/728* (2013.01)

(58) Field of Classification Search
CPC ....... H04B 10/032; H04J 14/72; H04J 14/724
USPC ...................................................... 398/5, 2, 1
See application file for complete search history.

(56) References Cited

U.S. PATENT DOCUMENTS

| | | | | |
|---|---|---|---|---|
| 5,327,275 | A * | 7/1994 | Yamane et al. .................... | 398/2 |
| 5,689,513 | A | 11/1997 | Okita et al. | |
| 2004/0190444 | A1* | 9/2004 | Trudel et al. .................. | 370/224 |
| 2007/0274724 | A1* | 11/2007 | Gumaste ......................... | 398/83 |
| 2014/0341560 | A1* | 11/2014 | Bamba .............................. | 398/5 |

FOREIGN PATENT DOCUMENTS

| | | |
|---|---|---|
| JP | 7-50656 | 2/1995 |
| JP | 2003-258851 | 9/2003 |
| JP | 2004-80434 | 3/2004 |

* cited by examiner

*Primary Examiner* — Oommen Jacob
(74) *Attorney, Agent, or Firm* — Fujitsu Patent Center

(57) ABSTRACT

A protection channel provisioning method includes: reserving a first protection channel corresponding to a first work channel and a second protection channel corresponding to a second work channel; provisioning a shared protection channel by configuring a circuit of node equipment provided on a shared route on which the first protection channel and the second protection channel are redundantly reserved so that a data signal of the first work channel or a data signal of the second work channel is transmitted via the shared route; and configuring a circuit of branch node equipment provided in a branch node at which the shared protection channel is guided to a first node corresponding to the first protection channel and a second node corresponding to the second protection channel so that the data signal transmitted via the shared protection channel is not guided to the first node and the second node.

7 Claims, 32 Drawing Sheets

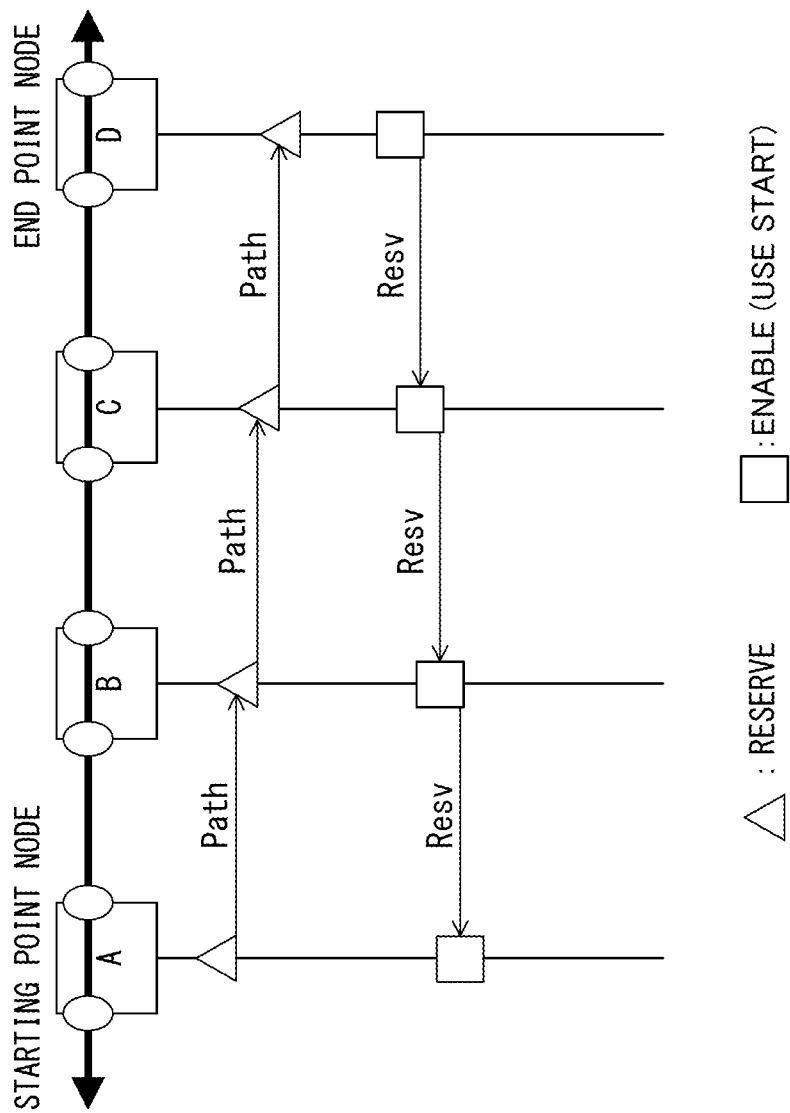
F I G. 1

| MESSAGE TYPE | STARTING POINT NODE | END POINT NODE | ROUTE INFORMATION | DATA TYPE | WORK/ PROTECTION FLAG | ASSOCIATION INFORMATION | STATE INFORMATION | ... |

F I G. 2

| #1 ODU1 | TS1 | TS2 | TS3 | TS4 | TS5 | TS6 | TS7 | TS8 | ... | TS80 |
|---|---|---|---|---|---|---|---|---|---|---|
| | x | | | | | | | | | |

| #2 ODU2 | TS1 | TS2 | TS3 | TS4 | TS5 | TS6 | TS7 | TS8 | ... | TS80 |
|---|---|---|---|---|---|---|---|---|---|---|
| | x | x | x | x | x | x | x | x | | |
| #4 ODU2 | x | x | x | x | x | x | x | x | | |

| #3 ODUflex(3) | TS1 | TS2 | TS3 | TS4 | TS5 | TS6 | TS7 | TS8 | ... | TS80 |
|---|---|---|---|---|---|---|---|---|---|---|
| | x | x | x | | | | | | | |

TS: Tributary Slot

F I G. 1 2

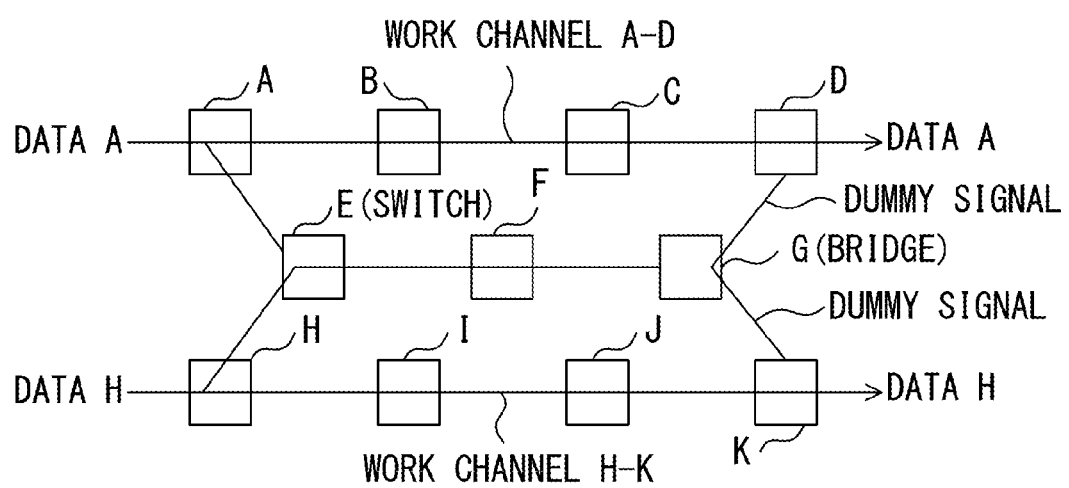
F I G. 1 7 A

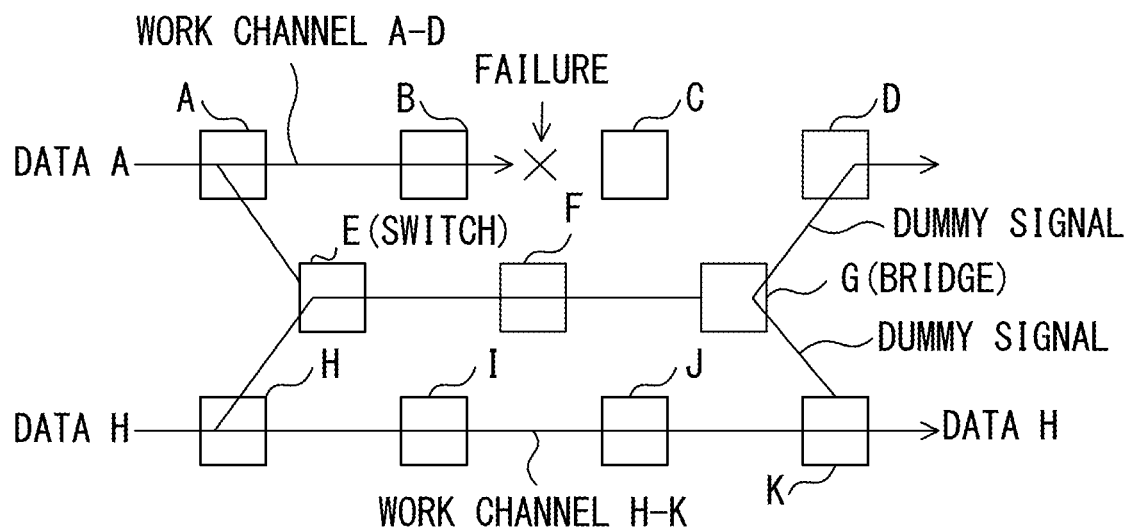
F I G. 1 7 B

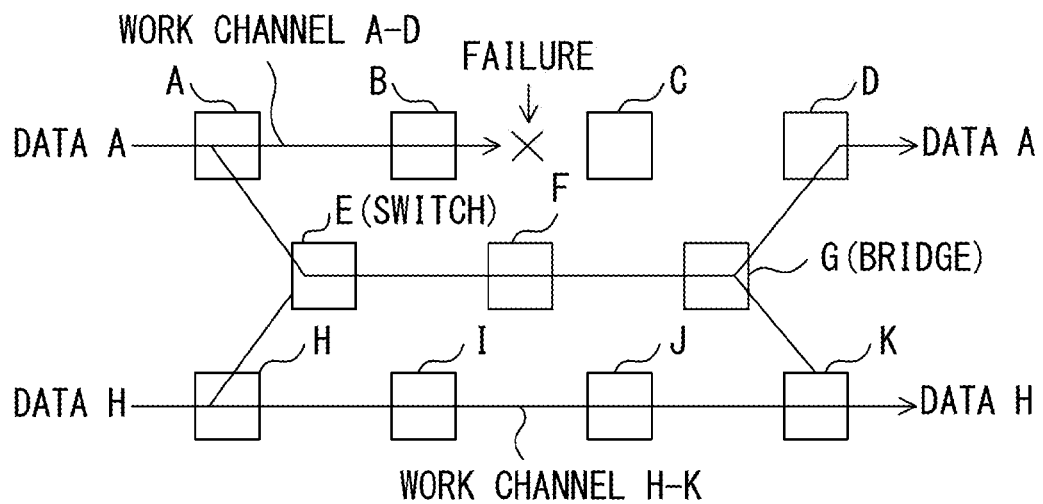
F I G. 17C

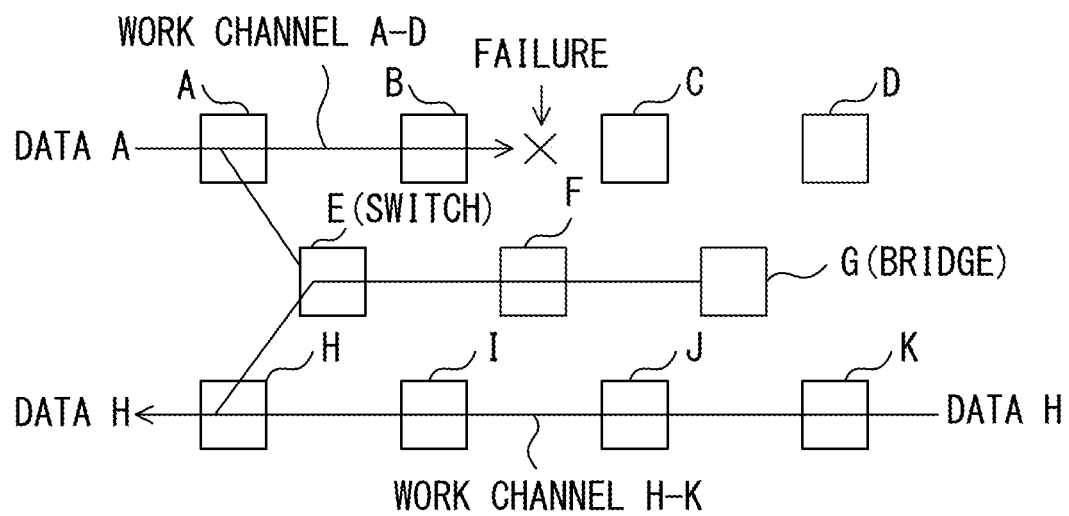
F I G. 18B

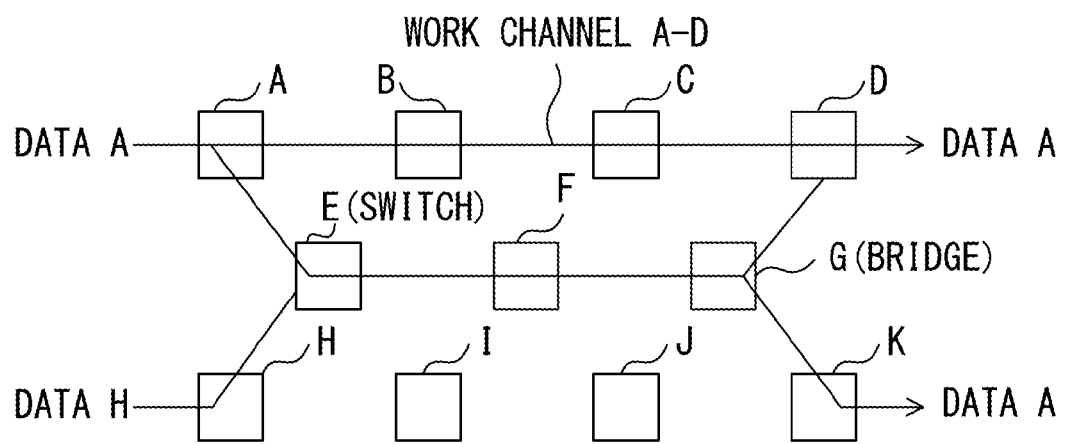
F I G. 1 9 A

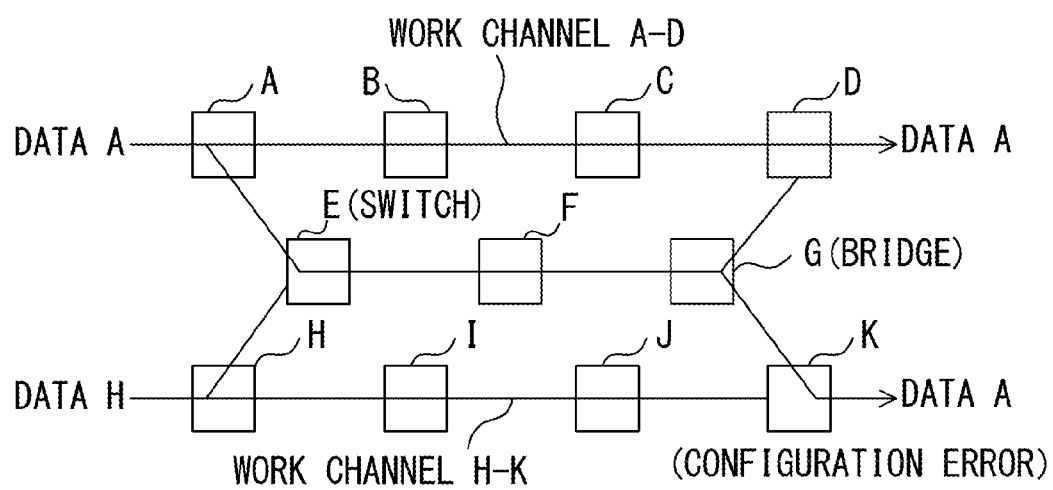
F I G. 19B

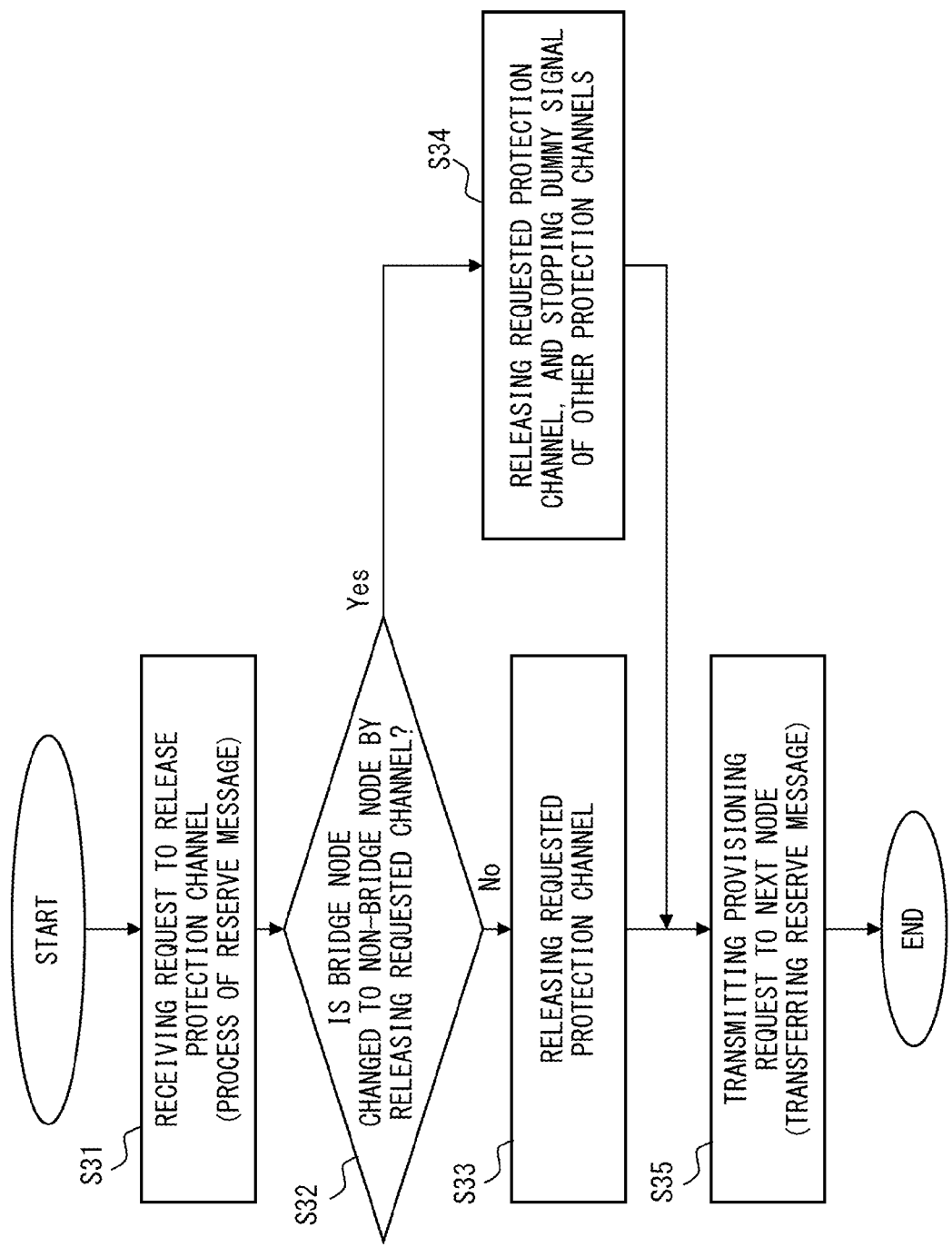
F I G. 2 1

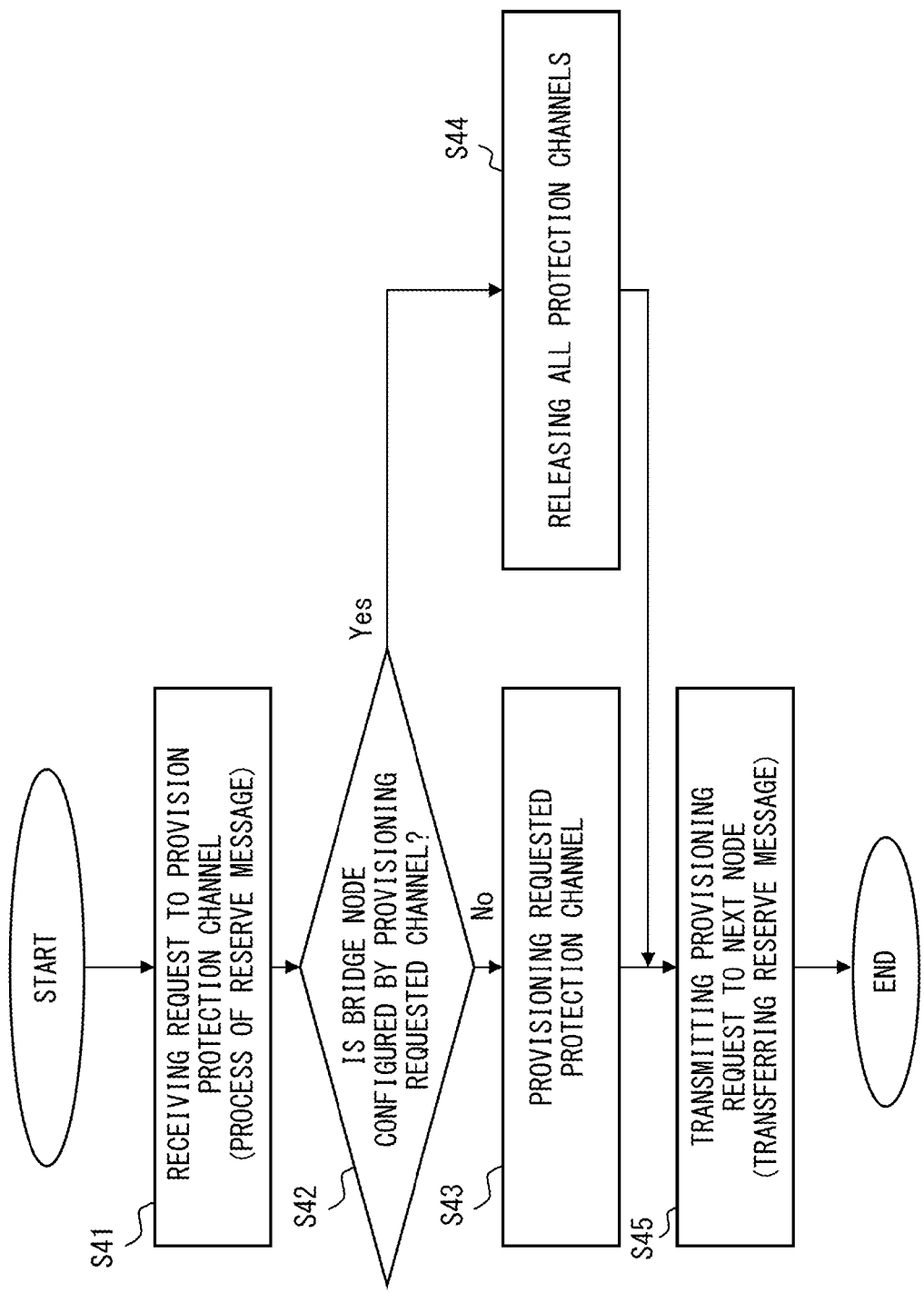
F I G. 24

PROTECTION CHANNEL PROVISIONING METHOD AND NODE EQUIPMENT

CROSS-REFERENCE TO RELATED APPLICATION

This application is based upon and claims the benefit of priority of the prior Japanese Patent Application No. 2013-105576, filed on May 17, 2013, the entire contents of which are incorporated herein by reference.

FIELD

The embodiments discussed herein are related to a protection channel provisioning method and node equipment used in a network system.

BACKGROUND

In a mesh network, a communication path can be configured via a desired route between a starting point node and an endpoint node. Accordingly, the mesh network can offer efficient operations.

To improve the reliability of the network, a protection channel is configured for a work channel. In this case, when a failure occurs on the work channel, data is transmitted via the protection channel.

However, a failure rarely occurs on a plurality of work channels at the same time in the mesh network. Therefore, Shared Mesh Protection is proposed as a method for efficiently configuring a protection channel in the mesh network. In Shared Mesh Protection, one protection channel is prepared for a plurality of work channels. Namely, one protection channel is shared by a plurality of work channels. A network where one protection channel is shared by N work channels is sometimes called 1:N protection. In contrast, a network where one protection channel is prepared for one work channel is sometimes called 1:1 protection.

A method for switching a communication path where a failure occurs to a bypass path in the mesh network is described, for example, in Japanese Laid-open Patent Publication No. 2003-258851. Other related techniques are described, for example, in Japanese Laid-open Patent Publication No. 2004-80434 and Japanese Laid-open Patent Publication No. 07-50656.

When a protection channel is shared, for example, by a work channel A and a work channel B, the protection channel may transmit data as a replacement for the work channel A or as a replacement for the work channel B. Accordingly, when one protection channel is prepared for a plurality of work channels, resources for the protection channel are reserved. However, the protection channel is not actually configured. When a failure occurs on any of the work channels, the protection channel is actually configured by using the reserved resources.

As described above, in the conventional Shared Mesh Protection, a protection channel is enabled due to an occurrence of a failure on a work channel. Here, to enable the protection channel, a configuration of hardware circuits is controlled in each node equipment on a path of the protection channel so that a data signal of a corresponding work channel is transmitted. However, a considerable amount of time is needed to control such a configuration of hardware circuits. Accordingly, the length of time needed from when a failure occurs on the work channel until a data transmission is recovered by using the protection channel is complete may be long. For example, when many nodes are provided between a starting point node and an end point node, the length of time needed to recover a data transmission is long.

SUMMARY

According to an aspect of the embodiments, a protection channel provisioning method used in a network system including a plurality of nodes includes: reserving a first protection channel corresponding to a first work channel and a second protection channel corresponding to a second work channel; provisioning a shared protection channel by configuring a circuit of node equipment provided on a shared route on which the first protection channel and the second protection channel are redundantly reserved so that a data signal of the first work channel or a data signal of the second work channel is transmitted via the shared route; and configuring a circuit of branch node equipment provided in a branch node at which the shared protection channel is guided to a first node corresponding to the first protection channel and a second node corresponding to the second protection channel so that the data signal transmitted via the shared protection channel is not guided to the first node and the second node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates procedures for configuring a channel by using RSVP-TE;

FIG. 2 illustrates an example of a path message;

FIG. 12 is an explanatory diagram of reservations of protection channels based on a type of a data signal;

FIGS. 17A to 17C illustrate an example of a misconnection avoiding method;

FIGS. 18A to 18C illustrate another example of the misconnection avoiding method;

FIGS. 19A and 19B illustrate another example of the misconnection;

FIG. 21 is a flowchart illustrating operations of node equipment that has received a request to release a provisioned protection channel in the first embodiment;

FIG. 24 is a flowchart illustrating operations of node equipment that has received a request to provision a protection channel in a second embodiment.

DESCRIPTION OF EMBODIMENTS

Background Art

Figure 3:
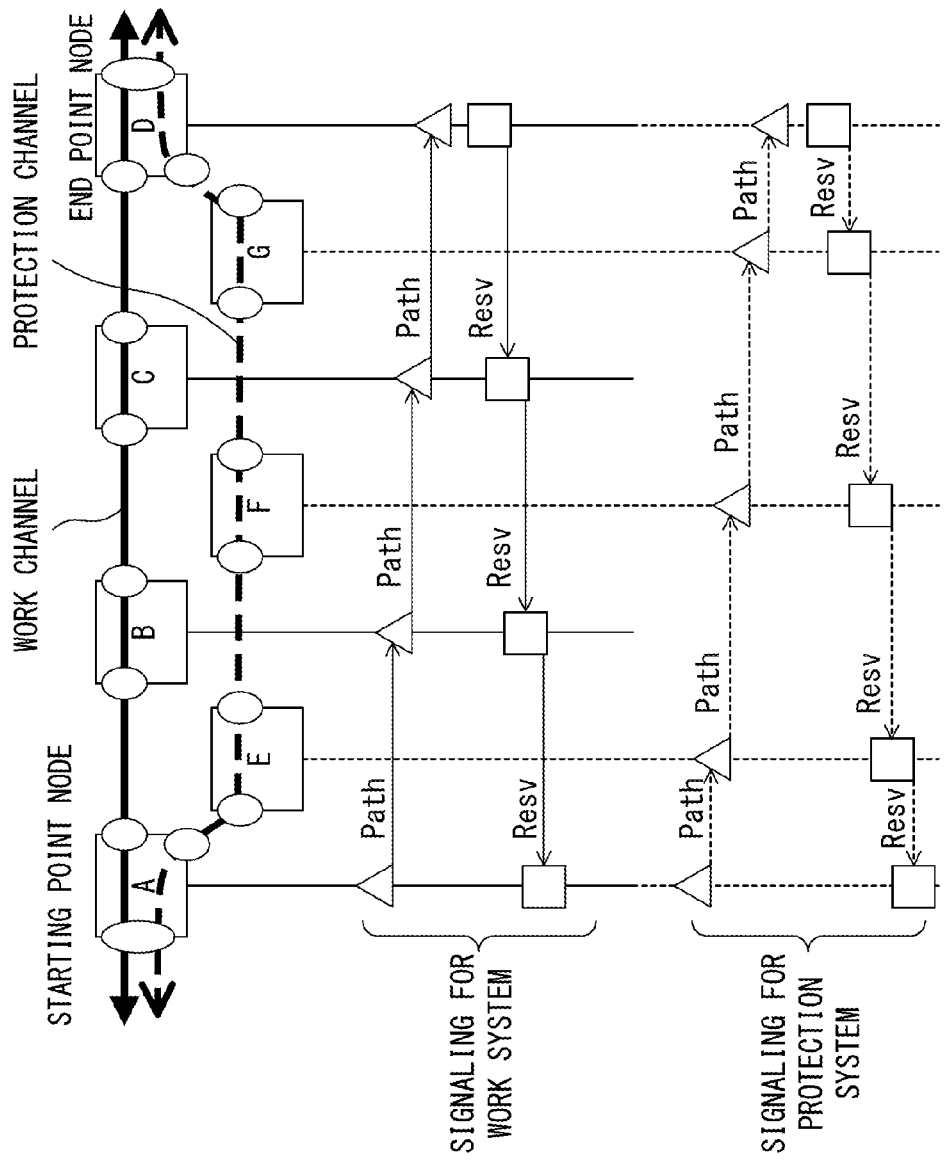
FIG. 3 illustrates procedures for configuring a work channel and a protection channel by using RSVP-TE.

Shared Mesh Protection for provisioning a protection channel in a mesh network is realized, for example, with signaling of RSVP-TE (Resource Reservation Protocol-Traffic Engineering) defined by RFC3209 or RFC4872 of IETF. In the signaling of RSVP-TE, a path message and a reserve message are used.

FIG. 1 illustrates procedures for configuring a channel by using RSVP-TE. FIG. 1 illustrates some (nodes A to D) of a large number of nodes provided within a mesh network. Assume that a channel (or a path) for transmitting a data signal from the node A to the node D via the nodes B and C is configured. In the following explanation, node equipment provided in a node x (x is A, B, C, . . . ) is referred to as "node equipment x".

The node equipment A generates a path message, and transmits the generated message to an endpoint node (namely, the node D). In FIG. 1, the path message is denoted as "Path". The path message includes, for example, a message type, a starting point node, an end point node, route information, a data type, a work/protection flag, association information, and state information as illustrated in FIG. 2.

The message type identifies a path message. The start point node and the end point node respectively indicate a starting point node and an end point node of a channel to be configured. The route information indicates a route on which a channel to be configured passes. The route information indicates a route, for example, based on nodes present between the starting point node and the endpoint node. In the example illustrated in FIG. 1, the starting point node is "A", the end point node is "D", and the route information is "B, C". The data type indicates a type of a data signal transmitted via the channel to be configured. In OTN (Optical Transport Network), the data type identifies, for example, ODU1, ODU2, ODUflex3 or the like. The work/protection flag, the association information, and the state information will be described later.

The path message transmitted from the node equipment A is transmitted to the node D via the nodes B and C according to the route information of the path message. At this time, each of the node equipments A to D reserves resources corresponding to the data type of the path message. Note that a symbol of triangle "Δ" indicates a process with which node equipment reserves resources according to the path message.

The node equipment D returns a reserve message corresponding to the received path message to the node A. In FIG. 1, the reserve message is denoted as "Resv". The reserve message generated by the node equipment D is transmitted to the node A via the nodes C and B. Upon receipt of the reserve message, each of the node equipments D to A enables the resources reserved in advance. A symbol of square "□" indicates a process with which node equipment enables resources according to the reserve message.

With the above described signaling, a channel for transmitting a data signal from the node A to the node D via the nodes B and C is configured. Also a channel for transmitting a data signal from the node D to the node A via the nodes C and B is configured with similar signaling. However, in the following description, to simplify an explanation, a node at one edge point and that at the other edge point are respectively referred to as a starting point node and an end point node in some cases even when a channel for bidirectionally transmitting data signals between nodes is configured.

Each of the node equipments has a plurality of ports. Each channel is configured via the port. In FIG. 1, each of the ports is represented as an ellipsis.

FIG. 3 illustrates procedures for configuring a work channel and a protection channel by using RSVP-TE. In this example, a work channel and a protection channel are configured between the node A and the node D. The work channel transmits a data signal between the node A and the node D via the nodes B and C. The protection channel transmits a data signal between the node A and the node D via nodes E, F and G.

The work channel is configured with the signaling described with reference to FIG. 1. However, with the signaling for configuring the work channel, the work/protection flag of a path message indicates "work". Moreover, the association information indicates the corresponding protection channel.

The protection channel is configured with similar signaling. However, with the signaling for configuring the protection channel illustrated in FIG. 3, the route information is "E, F, G." The work/protection flag of the path message indicates "protection". The association information indicates the corresponding work channel.

After the work channel and the protection channel are configured as described above, a data signal given to the node A is transmitted to the node D via the work channel, and also transmitted to the node D via the protection channel. Then, the node equipment D selects the data signal received via the work channel, and transfers the selected data signal to a client not illustrated.

When a failure occurs on the work channel, the node equipment D selects the data signal received via the protection channel. At this time, the protection channel is configured to be a state where the data signal is transmitted with the above described signaling, and transmits the same data signal as that of the work channel. Accordingly, when the failure occurs on the work channel, switching is made from the work channel to the protection channel in a short time.

Figure 4:
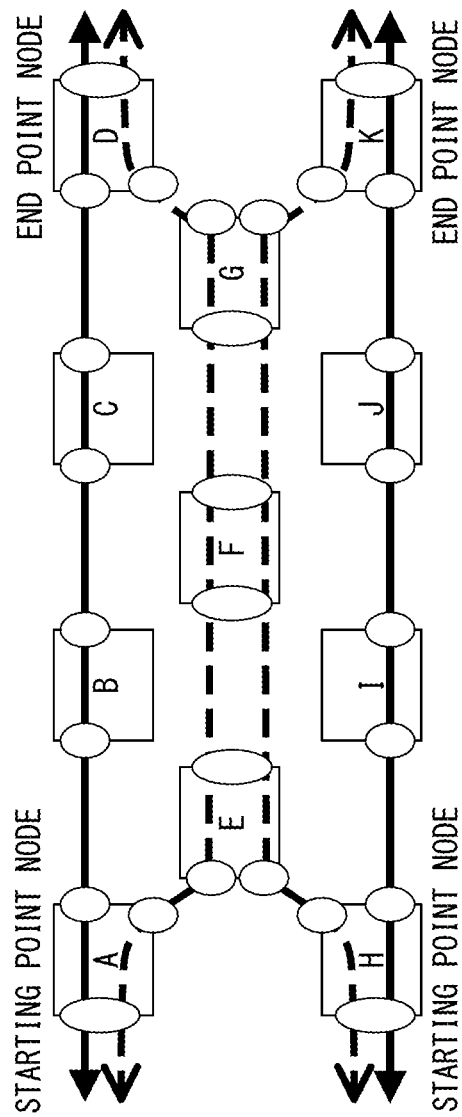
FIG. 4 illustrates an example of Shared Mesh Protection.

FIG. 4 illustrates an example of Shared Mesh Protection. In Shared Mesh Protection, one protection channel is shared by a plurality of work channels. In the example illustrated in FIG. 4, a work channel A-D (a channel for transmitting a data signal between the node A and the node D via the nodes B and C) and a work channel H-K (a channel for transmitting a data signal between the node H and the node K via the nodes I and J) are configured. A protection channel A-D corresponding to the work channel A-D transmits the data signal between the node A and the node D via the nodes E, F, and G. Moreover, a protection channel H-K corresponding to the work channel H-K transmits the data signal between the node H and the node K via the nodes E, F, and G. In this case, the nodes E, F, and G are used to provide the protection channel A-D and the protection channel H-K.

The channels (the work channel A-D, the protection channel A-D, the work channel H-K, and the protection channel H-K) illustrated in FIG. 4 may be respectively configured with the above described signaling. However, if the above described signaling is simply applied to Shared Mesh Protection, a conflict may occur.

Figure 5:
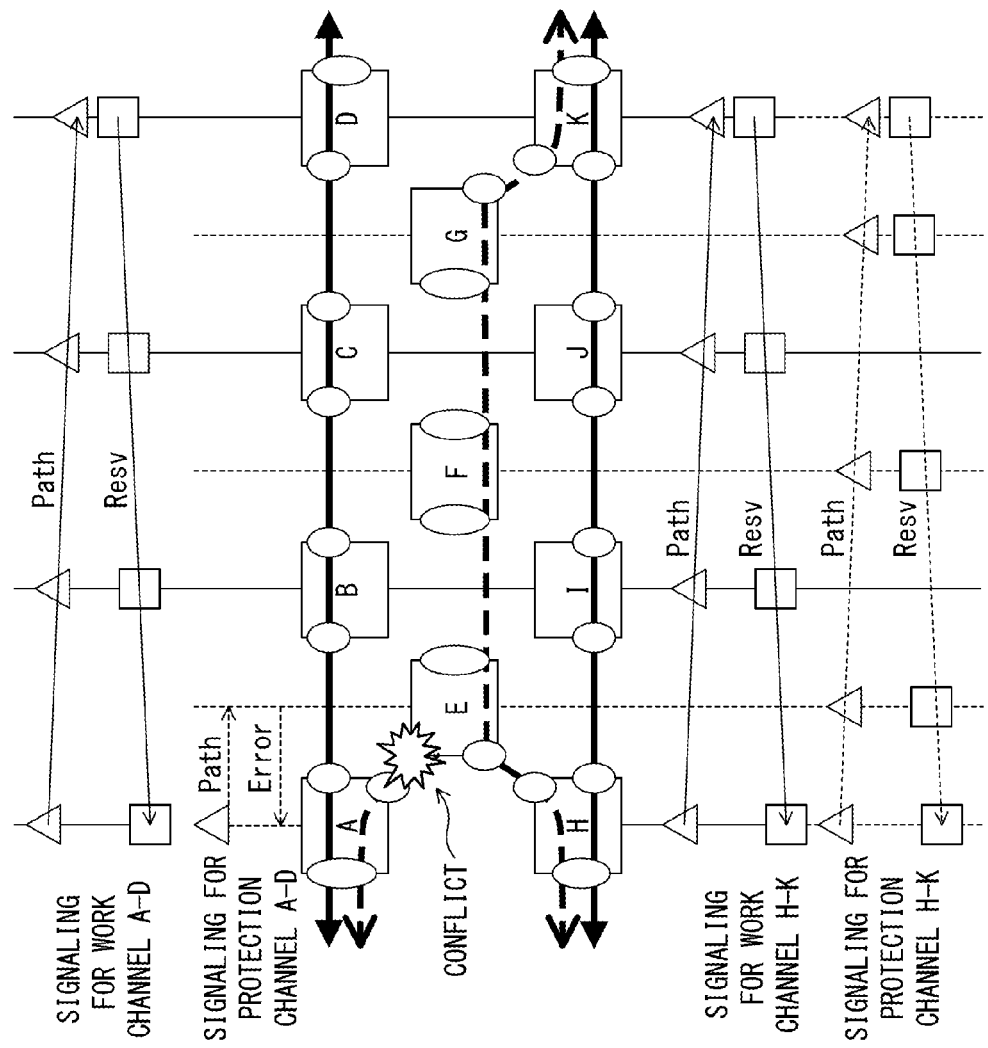
FIG. 5 is an explanatory diagram of a conflict of resources.

Assume that the work channel A-D, the work channel H-K, and the protection channel H-K are already configured as illustrated in FIG. 5. These channels are respectively configured with the above described signaling. Here, circuits for providing a channel in each of the node equipments are configured according to a reserve message of the above described signaling. For example, circuits of the node equipments A, B, C and D are configured to provide the work channel A-D.

Hereafter, when the protection channel A-D is configured, a path message is transmitted from the node equipment A to the node E. However, the circuits of the node equipment E are already configured to provide the protection channel H-K. Namely, the node equipment E does not reserve resources for providing the protection channel A-D due to a conflict with the protection channel H-K. Accordingly, the node equipment E returns an error message to the node A.

As described above, routes of a plurality of protection channels may overlap in Shared Mesh Protection. In the examples illustrated in FIG. 4 and FIG. 5, the protection channel A-D and the protection channel H-K overlap in the nodes E, F and G. However, when a conflict of resources occurs, a plurality of channels cannot be simultaneously configured on the same route. Namely, it is difficult to simply apply the signaling illustrated in FIG. 1 to Shared Mesh Protection.

Figure 6:
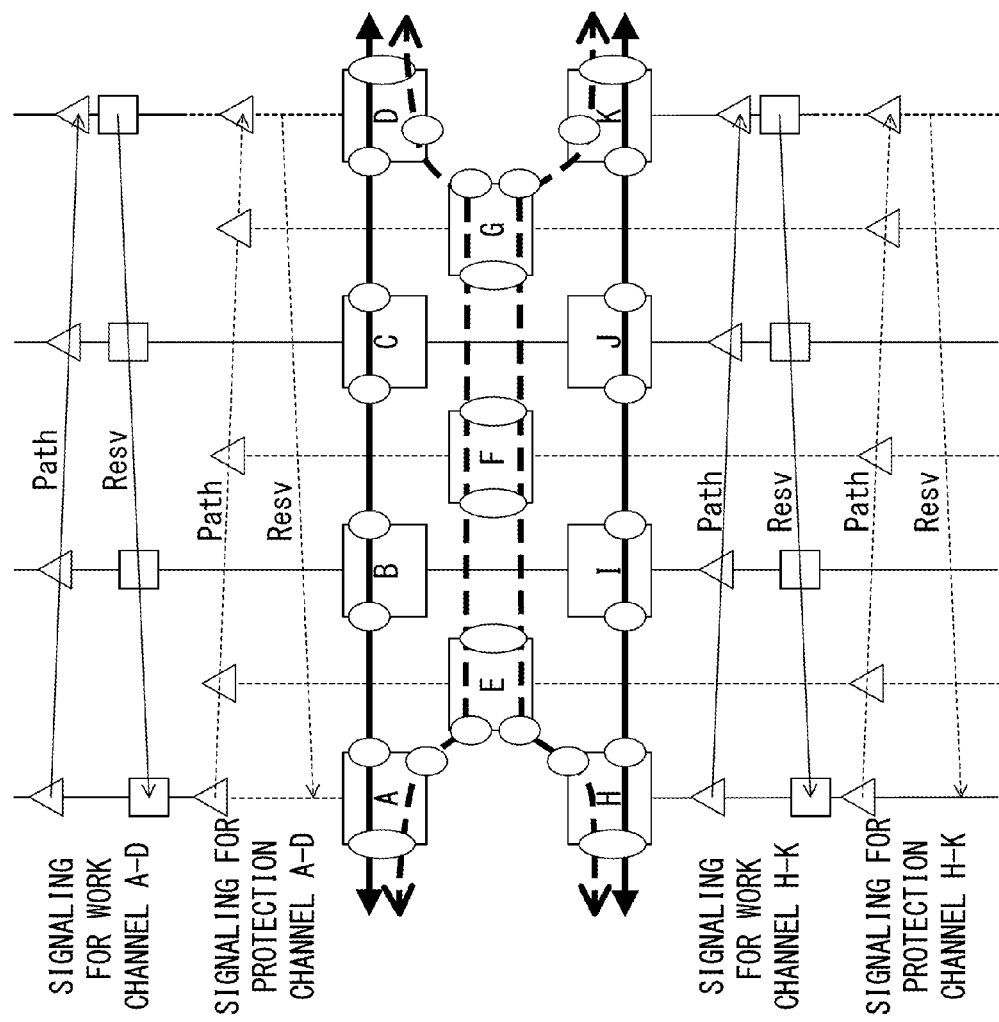
FIG. 6 illustrates another example of Shared Mesh Protection.

This problem may be solved, for example, with the method illustrated in FIG. 6. Namely, in the signaling for configuring a work channel, each node equipment reserves resources according to a path message, and enables the resources according to a reserve message. Namely, a work channel is configured to be a state where a data signal can be transmitted. In contrast, in the signaling for configuring a protection channel, each node equipment reserves resources according to a path message. However, node equipment does not enable the resources even though the node equipment receives a reserve message. In this case, circuits of the node equipments E, F and G are not configured to be a state where a data signal of the protection channel is transmitted.

However, with the above described signaling, it is confirmed that the node equipments E, F and G include the resources for the protection channel. Moreover, the node equipments E, F and G have reserved the protection channel A-D and the protection channel H-K. Accordingly, when a failure occurs on the work channel, the node equipments E, F and G can provide a corresponding protection channel for transmitting a data signal of the work channel.

Figure 7:
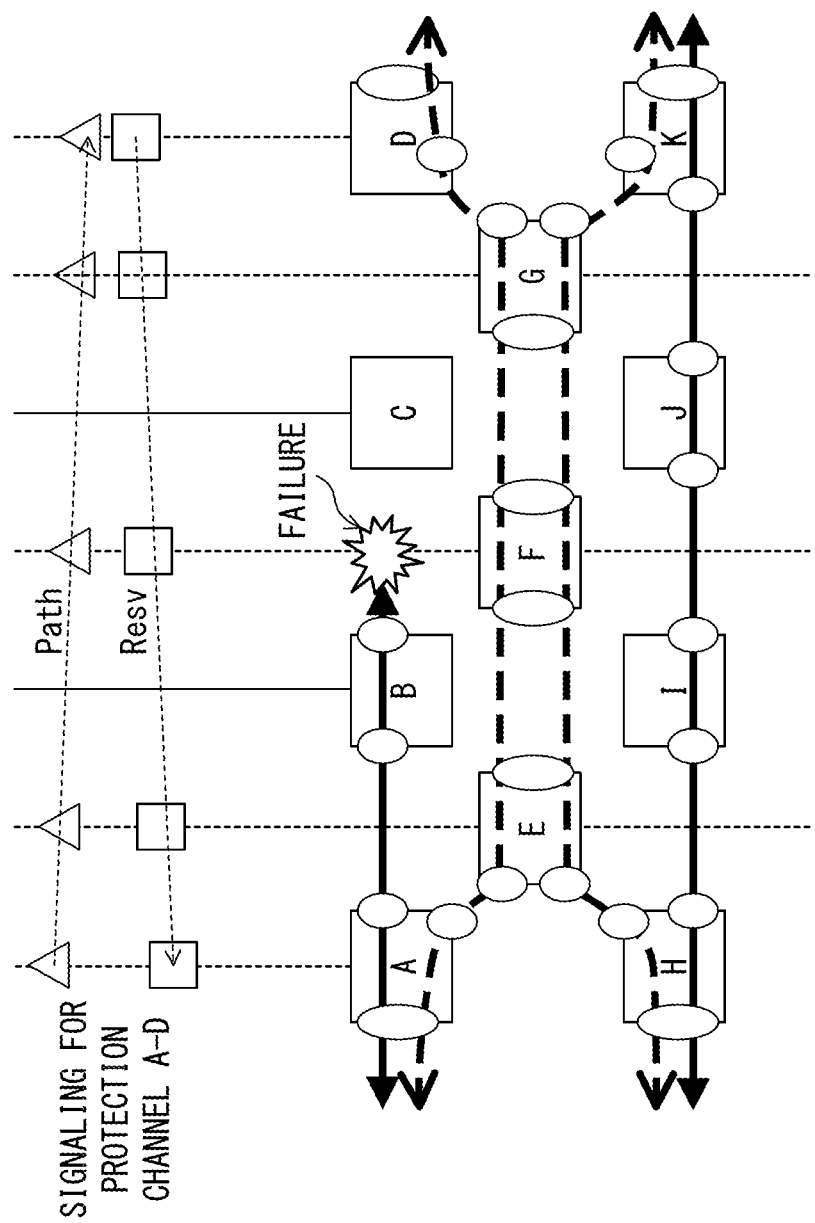
FIG. 7 illustrates an example of recovery procedures implemented by Shared Mesh Protection.

FIG. 7 illustrates an example of recovery procedures implemented with Shared Mesh Protection. Here, assume that the work channels are configured with the sequence illustrated in FIG. 6 and the protection channels are reserved. Also assume that a failure occurs on the work channel A-D.

When a failure occurs on a work channel, node equipments at both edges of the work channel respectively detect the failure. In the example illustrated in FIG. 7, the failure occurs on the work channel A-D, and the node equipments A and D respectively detect the failure. Then, for example, the node equipment A starts signaling for enabling a protection channel corresponding to the work channel A-D. In this signaling, the node equipments A and D respectively make switching from the work channel A-D to the protection channel A-D. Moreover, the node equipments E, F and G respectively configure their circuits so that a data signal is transmitted via the protection channel A-D. As a result, the data signal between the nodes A and D is transmitted via the protection channel A-D.

With this method, however, circuits of each of the node equipments are configured after the failure occurs on the work channel. Here, a certain length of time is needed to configure the circuits with respect to a data signal to be transmitted in each of the node equipments. Accordingly, with the method illustrated in FIG. 7, the length of time needed for switching from the work channel to the protection channel (namely, the length of time needed until a data signal is recovered) may be long.

EMBODIMENTS OF THE PRESENT INVENTION

Figure 8:
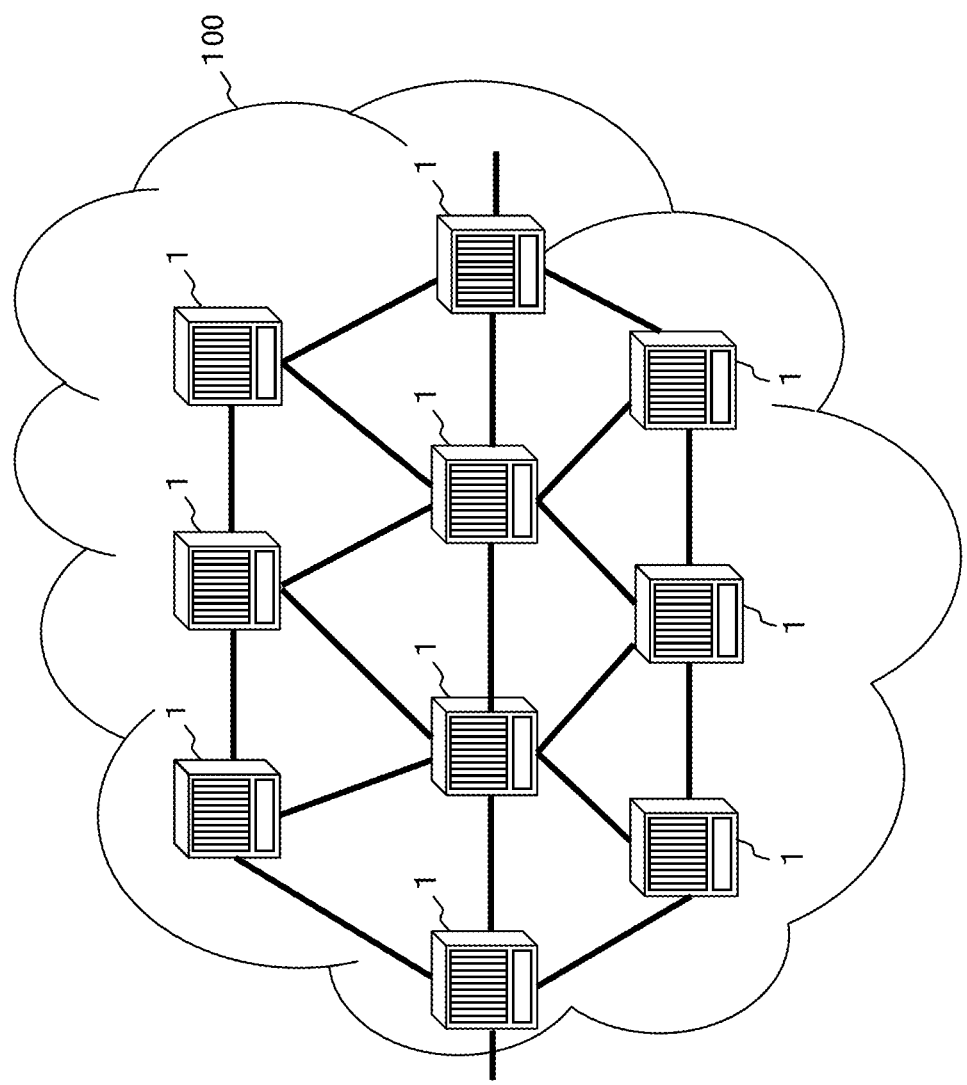
FIG. 8 illustrates an example of a network system according to an embodiment of the present invention.

FIG. 8 illustrates an example of a network system according to an embodiment of the present invention. The network system 100 according to the embodiment includes a plurality of nodes. Each of the nodes is provided with the node equipment 1 as illustrated in FIG. 8. Note that FIG. 8 illustrates an example of a data plane of the network system 100. Namely, in FIG. 8, each link that connects between the nodes transmits a data signal. Each link is implemented, for example, with an optical fiber. Moreover, the data signal propagates, for example, client data.

The network system 100 is a mesh network. Each of the node equipments 1 is connected to one or a plurality of different node equipments 1. Namely, each of the node equipments 1 can transmit a data signal to one or a plurality of adjacent nodes. Moreover, each of the node equipments 1 can receive a data signal from one or a plurality of adjacent nodes.

The network system 100 can transmit a data signal between arbitrary nodes designated by a user. In this case, a channel is provisioned between the designated nodes with the signaling described with reference to FIG. 1. The data signal may be a WDM signal. In this case, one or a plurality of data signals may be transmitted by one wavelength channel. In addition, the data signal may be a TDM (OTN (Optical Transport Network), SONET (Synchronous Optical Network), or SDH (Synchronous Digital Hierarchy) or the like) signal.

A control signal for configuring a channel (namely, a message of the signaling) is transmitted, for example, via the data plane illustrated in FIG. 8. In this case, also the control signal for configuring a channel is transmitted via a network for transmitting a data signal. However, the control signal for configuring a channel may be transmitted by using a control plane prepared separately from the data plane.

Figure 9:
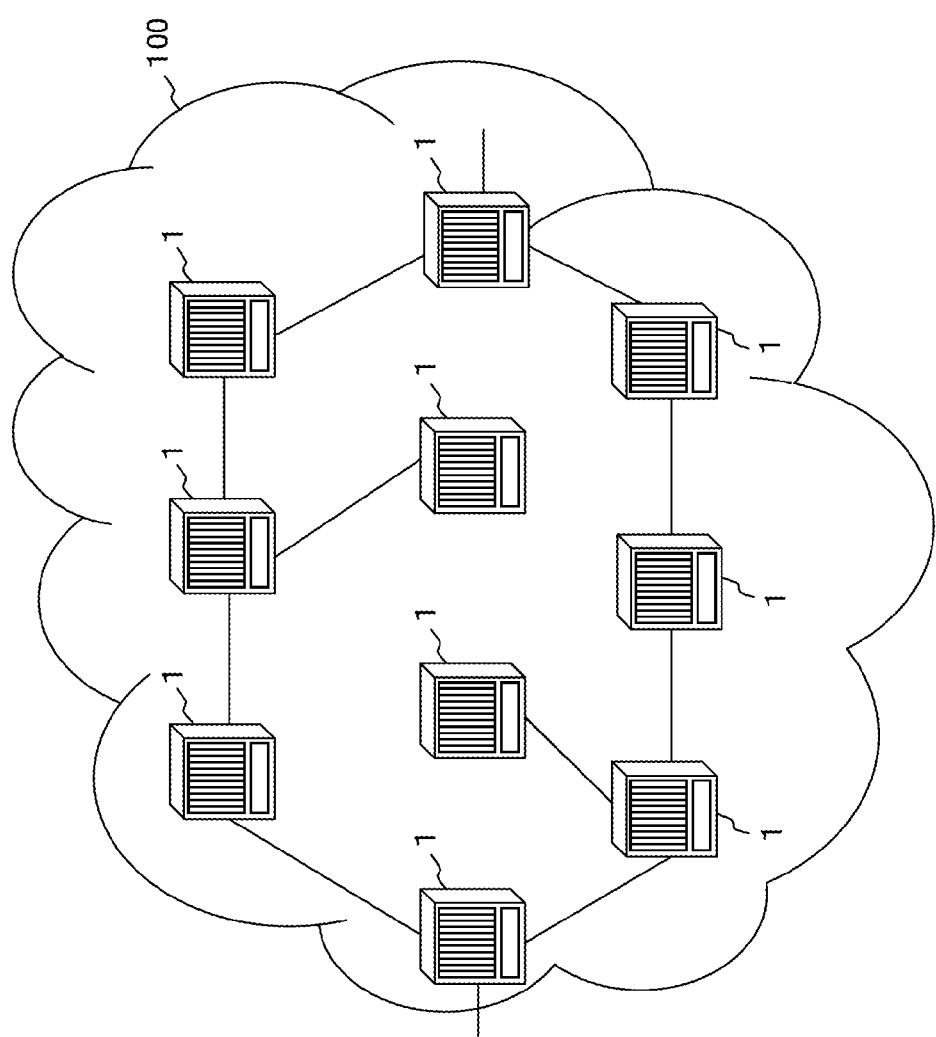
FIG. 9 illustrates an example of a control plane.

As illustrated in FIG. 9, the control plane may have a topology different from that of the data plane. Moreover, in the example illustrated in FIG. 9, each of the node equipments 1 is connected to one or a plurality of different node equipments 1. However, the control plane may be implemented as a different configuration. For example, the control plane may have a configuration in which node equipment is connected to one or a plurality of different node equipments 1 via a network management system not illustrated.

Figure 10:
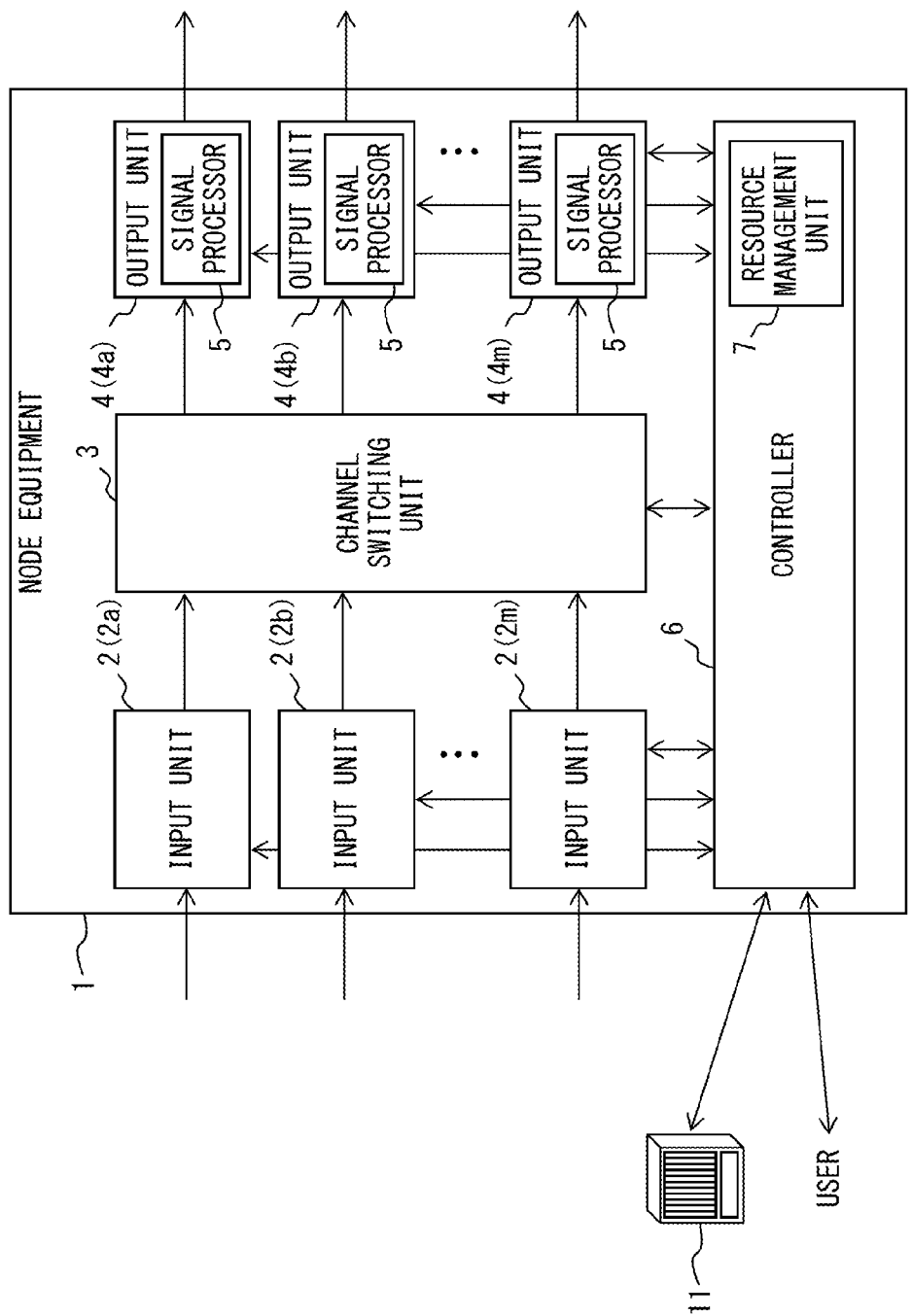
FIG. 10 illustrates an example of a configuration of node equipment according to an embodiment of the present invention.

FIG. 10 illustrates an example of a configuration of the node equipment 1 according to the embodiment of the present invention. As illustrated in FIG. 10, the node equipment 1 includes a plurality of input units 2 (2a to 2m), a channel switching unit 3, a plurality of output units 4 (4a to 4m), and a controller 6. The node equipment 1 may include other circuit elements.

The input unit 2 receives and terminates a data signal transmitted from adjacent node equipment. Accordingly, the input unit 2 includes a hardware circuit for receiving and terminating a data signal. This hardware circuit is configured by the controller 6 according to a type of a data signal, or the like. Moreover, each of the input units 2 is coupled to a corresponding input port of the channel switching unit 3.

The channel switching unit 3 has a plurality of input ports and a plurality of output ports. To each of the input ports, a corresponding input unit 2 can be coupled. To each of the output ports, a corresponding output unit 4 can be coupled. The channel switching unit 3 connects between an input port and an output port according to an instruction issued from the controller 6. Namely, the channel switching unit 3 can guide a data signal of an arbitrary input unit 2 to a designated output unit 4 according to the instruction issued from the controller 6. Accordingly, the channel switching unit 3 includes a hardware circuit for guiding a data signal from a designated input port to a designated output port. Also this hardware circuit is configured by the controller 6 according to a type of a data signal, or the like.

The output unit 4 transmits a data signal to adjacent node equipment. Accordingly, the output unit 4 includes a hardware circuit for transmitting a data signal. Also this hardware circuit is configured by the controller 6 according to a type of a data signal, or the like. Moreover, each of the output units 4 is coupled to a corresponding output port of the channel switching unit 3. Moreover, the output unit 4 includes a signal processor 5. The signal processor 5 can generate a dummy signal and transmit the generated dummy signal to a channel according to an instruction issued from the controller 6.

The controller 6 controls operations of the node equipment 1. Namely, the controller 6 controls at least the input units 2, the channel switching unit 3, and the output units 4. Moreover, the controller 6 supports, for example, GMPLS in order to configure a channel for transmitting a data signal. In this case, the controller 6 implements, for example, LMP (Link Management Protocol), OSPF-TE (Open Shortest Path First with Traffic Engineering), RSVP-TE, PCEP (Path Communication Element Protocol), and the like.

The controller 6 transmits and receives a control signal for configuring a channel based on GMPLS to and from equipment 11 (such as different node equipment 1 or the network management system) connected to the network system 100. The controller 6 may transmit the control signal by using the data plane illustrated in FIG. 8, or may transmit the control signal by using the control plane illustrated in FIG. 9. Moreover, the controller 6 can execute a command input from a user. For example, the controller 6 may receive a command related to LMP or OSPF-TE from a user, and execute the command. Additionally, the controller 6 may execute a command (RSVP-TE command or the like) for configuring a channel.

When a channel is configured with RSVP-TE, the controller 6 verifies states of the input units 2, the channel switching unit 3, and the output units 4 upon receipt of a path message, and reserves resources designated by the path message. Information that indicates contents of a reservation includes, for example, information indicating a data type, and is stored in a resource management unit 7. When the resources designated by the path message cannot be reserved, the controller 6 returns an error message. Moreover, upon receipt of a reserve message, the controller 6 enables the resources reserved according to the path message. At this time, the controller 6 configures the hardware circuits of the input units 2, the channel switching unit 3, and the output units 4 based on the contents of the reservation.

For example, OTN supports a plurality of data rates. Specifically, OTN supports ODU1, ODU2, ODUflex3 and the like. Here, for ODU1, ODU2, and ODUflex3 and the like, their frame signals are respectively processed based on different clocks, and different overheads are used. Accordingly, hardware circuits for processing ODU1, ODU2, and ODUflex 3 are different in the node equipment 1. In other words, hardware circuits of the node equipment 1 are configured according to a type of a data signal when the type of the data signal (here, ODU1, ODU2 or ODUflex3) is designated. Accordingly, the controller 6 configures the hardware circuits of the input units 2, the channel switching unit 3, and the output units 4 based on the type of the data signal when the controller 6 enables the reserved resources. As a result, a channel corresponding to a requested type of a data signal is configured, and a state where the data signal is transmitted is realized.

Figure 11:
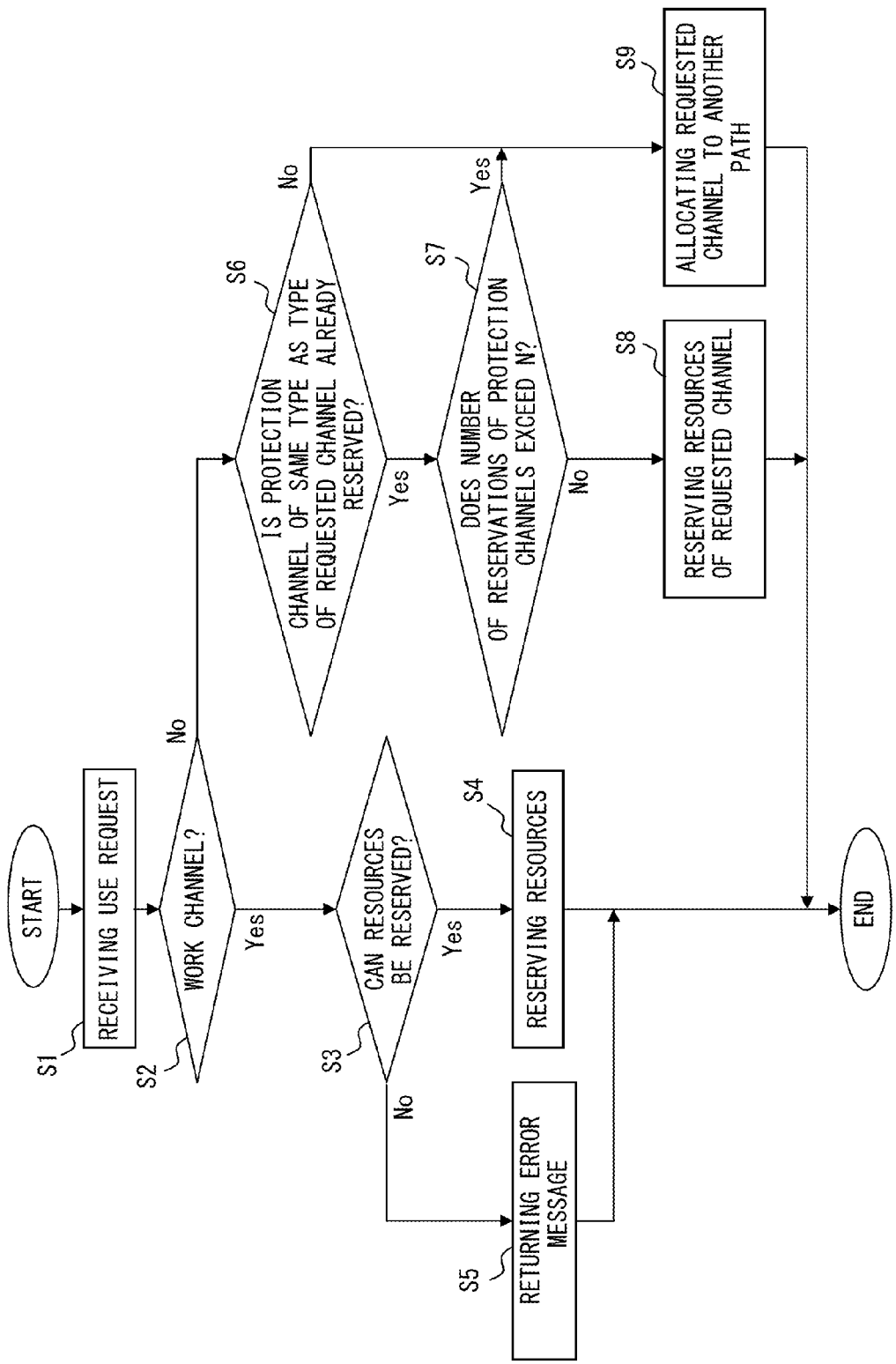
FIG. 11 is a flowchart illustrating operations of node equipment upon receipt of a request to use a channel.

FIG. 11 is a flowchart illustrating operations of node equipment upon receipt of a request to use a channel. The following explanation assumes that the request to use a channel is a path message of RSVP-TE.

In S1, the controller 6 receives the path message. Assume that the path message has the format illustrated in FIG. 2 in this example. In S2, by referencing the "work/protection" flag of the path message, the controller 6 decides which of a work channel and a protection channel is requested.

When the work channel is requested by the path message, the controller 6 decides whether or not resources for the requested work channel can be reserved. At this time, the controller 6 decides whether or not the requested resources can be reserved based on the "route information" and the "data type" of the path message, and use states of the input units 2, the channel switching unit 3, and the output units 4. When the requested resources can be reserved, the controller 6 reserves the requested resources in S4. In contrast, when the requested resources cannot be reserved, the controller 6 returns an error message in S5.

When the protection channel is requested by the path message, the process of the controller 6 proceeds to S6. In S6, the controller 6 decides whether or not a protection channel of the same type as that of the requested channel has already been reserved. Assume that the "type of a channel" is represented by a type of a data signal transmitted via the channel. When the protection channel of the same type as that of the requested channel has already been reserved, the controller 6 decides whether or not the number of reservations of protection channels (including a newly requested protection channel) exceeds N. N is an integer that is larger than or equal to 2 and designated in advance. Note that N is equivalent to a maximum number of work channels that can share one protection channel.

If the number of reservations of protection channels does not exceed N, the controller 6 reserves resources of the requested protection channel in S8. In this case, a route on which the newly requested channel is provisioned is shared by a plurality of protection channels. In contrast, if the number of reservations of protection channels exceeds N, the controller 6 allocates the requested channel to another route (or returns an error message) in S9. Also when the protection channel of the same type as that of the requested channel has not been provisioned, S9 is executed. In this case, when the requested resources can be reserved, the controller 6 may reserve the resources. In contrast, when the requested resources cannot be reserved, the controller 6 may return an error message.

As described above, a route of the network system 100 (or node equipment 1 on the route) may be shared by protection channels that transmit a data signal of the same type. A case where protection channels for respectively transmitting data signals #1 to #4 illustrated in FIG. 12 are requested is described as one example. Note that FIG. 12 illustrates an example where the data signals are assigned to tributary slots TS.

Assume that a protection channel for the data signal #1 was previously requested, and resources corresponding to ODU1 have been reserved. Here, none of the data signals #2, #3 and #4 are ODU1. Accordingly, in this case, protection channels for the data signals #2, #3 and #4 are allocated to route(s) different from the protection channel for transmitting the data signal #1.

In the meantime, if the protection channel for the data signal #2 was requested earlier, resources corresponding to ODU2 have been reserved. Here, the data signal #4 is ODU2. Accordingly, node equipment can reserve the protection channel for the data signal #4 in this case. Namely, the protection channel for the data signal #2 and that for the data signal #4 are redundantly reserved on the same route.

Figure 13:
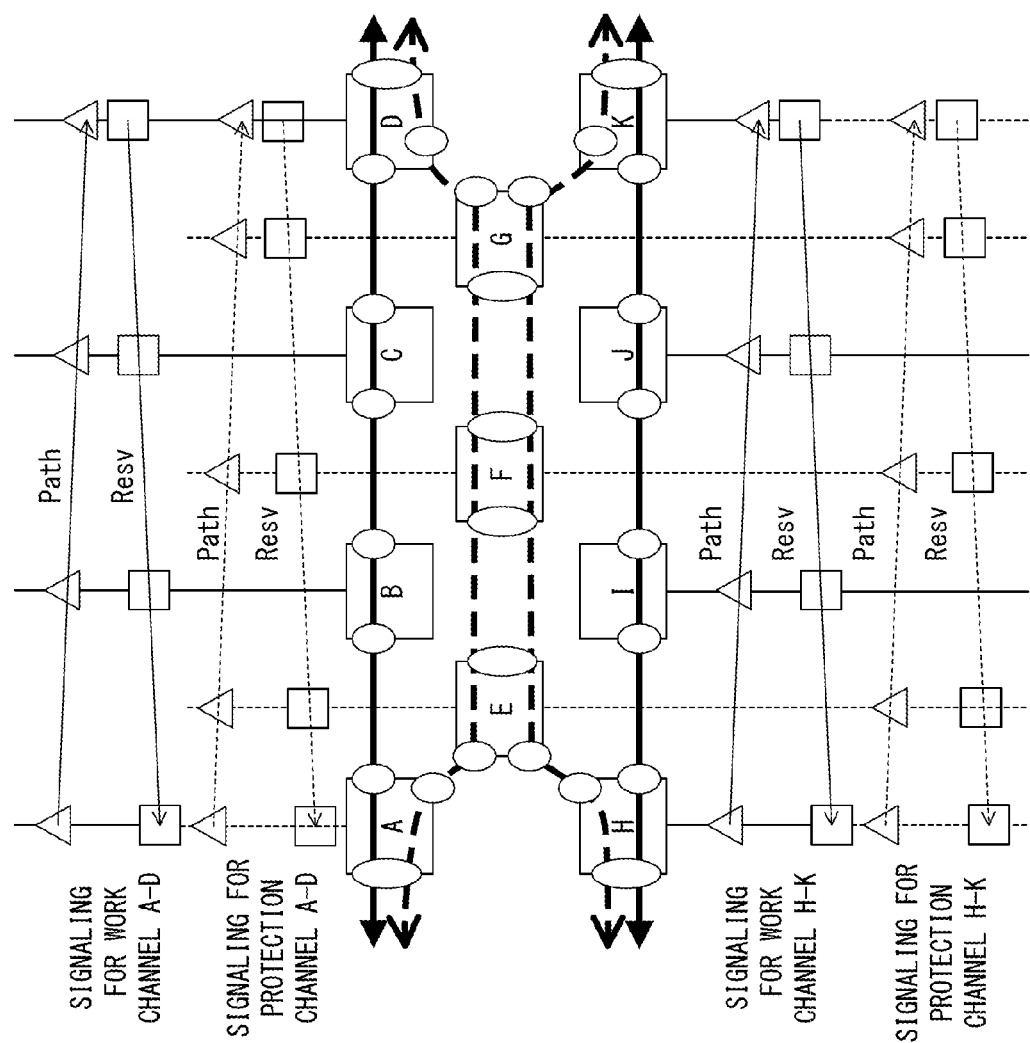
FIG. 13 illustrates an example of Shared Mesh Protection implemented with a protection channel provisioning method according to an embodiment.

FIG. 13 illustrates an example of Shared Mesh Protection implemented by the protection channel provisioning method according to the embodiment of the present invention. Note that the method for configuring the work channel A-D and the work channel H-K is substantially the same as that in the example described with reference to FIG. 4 or FIG. 6. Accordingly, an explanation of the method for configuring a work channel is omitted. However, in this example, a type of a data signal of the work channel A-D and a type of a data signal of the work channel H-K are assumed to be the same. For example, both the data signals of the work channel A-D and that of the work channel H-K are assumed to be ODU2.

The following explanation assumes that the protection channel corresponding to the work channel A-D is requested and the protection channel corresponding to the work channel H-K is requested thereafter. In this case, the node equipment A initially generates the following path message. Note that a type of a data signal of the protection channel corresponding to the work channel A-D is the same as that of the data signal of the work channel A-D.
starting point node: A
end point node: D
route information: E, F, G
data type: ODU2
work/protection flag: protection
association information: work channel A-D
state information: unused The state information indicates whether or not a data signal transmitted via the channel is used in an actual communication. For example, when the corresponding work channel properly operates, a data signal transmitted via the protection channel is discarded without being used. Accordingly, in this case, the state information indicates "unused" in the path message for provisioning a protection channel.

The above described path message is transmitted from the node A to the node D via the nodes E, F and G based on the route information. At this time, the node equipments A, E, F, G and D respectively reserve the resources requested by the path message. Moreover, the node equipment D returns a reserve message corresponding to the received path message.

By so doing this reserve message is transmitted from the node D to the node A via the nodes G, F and E based on the route information.

During transmission of the reserve message, the node equipments D, G, F, E and A respectively enable the resources reserved according to the above path message. Namely, the node equipments D, G, F, E and A respectively configure hardware circuits so that ODU2 is transmitted. For example, the node equipment A configures the hardware circuits (the input units 2, the channel switching unit 3, and the output units 4) so that an input ODU2 data signal is transmitted to both the node B and the node E. The node equipment E configures the hardware circuits so that the ODU2 data signal received from the node A is transferred to the node F. The node equipment F configures the hardware circuits so that the ODU2 data signal received from the node E is transferred to the node G. The node equipment G configures the hardware circuits so that the ODU2 data signal received from the node F is transferred to both the node D and the node K. The node equipment D configures the hardware circuits so that the ODU2 data signal transmitted from the node equipment G can be received. Note that, however, the channel switching unit 3 is configured to select not the data signal from the node G but the data signal from the node C in the node equipment D.

With the above described signaling, the protection channel A-D corresponding to the work channel A-D is provisioned on a route from the node A to the node D via the nodes E, F and G. The protection channel A-D transmits the same data signal as that of the work channel A-D.

Hereafter, the node equipment H generates the following path message in order to request a protection channel corresponding to the work channel H-K. Note that a type of a data signal of the protection channel corresponding to the work channel H-K is the same as that of the data signal of the work channel H-K.
starting point node: H
end point node: K
route information: E, F, G
data type: ODU2
work/protection flag: protection
association information: work channel H-K
state information: unused This path message is transmitted from the node H to the node K via the nodes E, F and G based on the route information. Here, the route EFG is already reserved by the protection channel (hereinafter referred to as a protection channel A-D) corresponding to the work channel A-D. However, the type of the data signal of the protection channel A-D is ODU2, and also the type of the data signal requested by the new path message is ODU2. Namely, the type of the data signal requested by the new path message is the same as that of the data signal of the protection channel A-D reserved earlier. In this case, a decision of S6 in the flowchart illustrated in FIG. 11 results in "YES" in each of the node equipments E, F and G. Accordingly, the node equipments E, F and G respectively reserve the resources of the protection channel requested by the new path message. At this time, also the node equipments H and K respectively reserve the resources of the protection channel requested by the new path message.

The node equipment K returns a reserve message corresponding to the received path message. Then, this reserve message is transmitted from the node K to the node H via the nodes G, F, and E based on the path information.

During transmission of the reserve message, the node equipments K, G, F, E and H respectively enable the resources reserved according to the above path message. Namely, the node equipments K, G, F, E and H respectively configure their hardware circuits so that ODU2 is transmitted.

For example, the node equipment H configures the hardware circuits (the input units 2, the channel switching unit 3, and the output units 4) so that an input ODU2 data signal is transmitted to both the node I and the node E. The node equipment E configures the hardware circuits so that the ODU2 data signal received from the node H is transferred to the node F. The node equipment F configures the hardware circuits so that the ODU2 data signal received from the node E is transferred to the node G. The node equipment G configures the hardware circuits so that the ODU2 data signal received from the node F is transferred to both the node D and the node K. The node equipment K configures the hardware circuits so that the ODU2 data signal transmitted from the node equipment G can be received. Note that, however, the channel switching unit 3 is configured to select not the data signal from the node G but that from the node J in the node equipment K.

However, when signaling for the protection channel corresponding to the work channel H-K (hereinafter referred to as a protection channel H-K) is performed, the hardware circuits of the node equipments E, F and G are already configured to provide the protection channel A-D. Moreover, the type of the data signal of the protection channel A-D and that of the data signal of the protection channel H-K are the same. Namely, the configuration of the hardware circuits for the protection channel A-D and the configuration of the hardware circuits for the protection channel H-K are the same in the node equipments E, F and G, respectively. Accordingly, the node equipments E, F and G do not need to reconfigure the hardware circuits upon receipt of the reserve message for provisioning the protection channel H-K.

As a result, the protection channel H-K corresponding to the work channel H-K is substantially provisioned on the route from the node H to the node K via the nodes E, F and G. Then, the protection channel H-K may transmit the same data signal as that of the work channel H-K.

As described above, in the example illustrated in FIG. 13, the protection channel A-D corresponding to the work channel A-D, and the protection channel H-K corresponding to the work channel H-K are reserved on the route EFG. Unlike the method illustrated in FIG. 6, resources corresponding to a reserved protection channel are enabled with the protection channel provisioning method according to the embodiment. Note that, however, only one protection channel is enabled on the route EFG on which a plurality of protection channels are reserved. For example, hardware circuits of node equipment on the route are configured so that a protection channel corresponding to a reserve message to be processed later is realized.

In the above described example, the protection channel A-D and the protection channel H-K are reserved on the route EFG. Then, the protection channel A-D or the protection channel H-K is provisioned on the route EFG. Here, the type of the data signal of the protection channel A-D and the type of the data signal of the protection channel H-K are the same. Namely, a configuration of the hardware circuits for providing the protection channel A-D and the configuration of the hardware circuits for providing the protection channel H-K are substantially the same in the node equipments E, F and G. Accordingly, even when the protection channel A-D is provisioned on the route EFG, the protection channel can transmit the data signal of the work channel H-K. Similarly, even when the protection channel H-K is provisioned on the route EFG, the protection channel can transmit the data signal of the work channel A-D. Namely, the channel configured on the route EFG is used as a "shared protection channel" shared by the work channel A-D and the work channel H-K.

Figure 14:
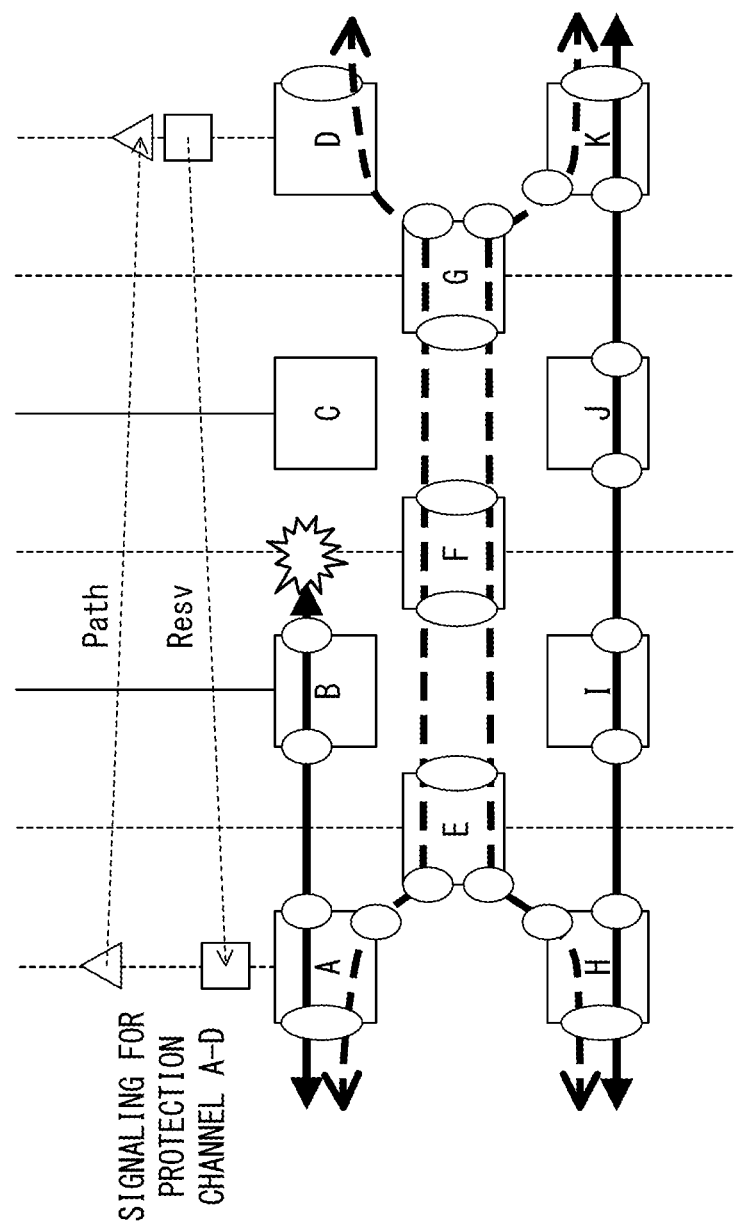
FIG. 14 illustrates an example of recovery procedures according to Shared Mesh Protection illustrated in FIG. 13.

FIG. 14 illustrates an example of recovery procedures implemented with Shared Mesh Protection illustrated in FIG. 13. This example assumes that a failure occurs on the work channel A-D as illustrated in FIG. 14.

When a failure occurs on a work channel, node equipments at both edges of the work channel detect the failure. In the example illustrated in FIG. 14, the failure occurs on the work channel A-D, and the node equipments A and D respectively detect the failure. Then, for example, the node equipment A starts signaling for configuring a protection channel corresponding to the work channel A-D. Namely, the node equipment A starts the signaling for using the shared protection channel on the route EFG as a protection channel for transmitting the data signal of the work channel A-D. In this case, a path message generated by the node equipment A includes "state information: used".

The path message is transmitted from the node equipment A to the node D via the nodes E, F and G, and a reserve message is returned from the node equipment D to the node A via the nodes G, F and E. However, the shared protection channel is already configured on the route EFG. Moreover, this shared protection channel can transmit a data signal of the work channel A-D. Namely, the hardware circuits of the node equipments E, F and G are already configured to be in a state where the data signal of the work channel A-D can be transmitted. Thus, the node equipments E, F and G do not need to reconfigure the hardware circuits in order to transmit the data signal of the work channel A-D via the shared protection channel. Accordingly, comparing with the method illustrated in FIG. 7, the length of time needed for the signaling for switching from a work channel to a protection channel is reduced with the method according to the embodiment. Namely, activation of the protection channel is made faster.

Figure 15:
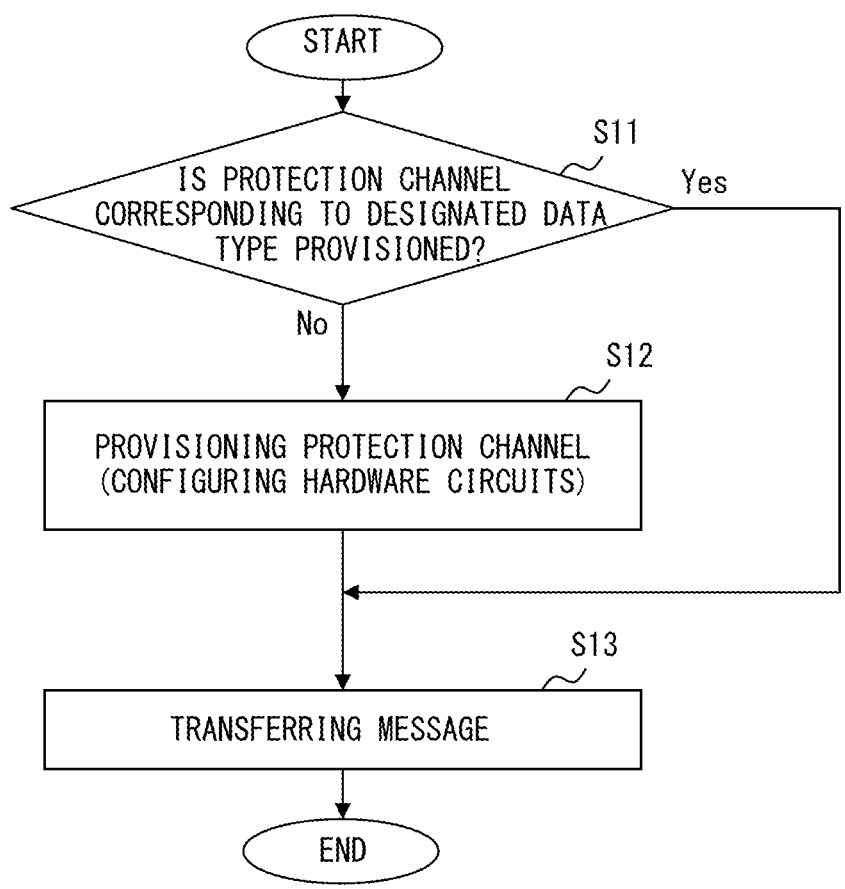
FIG. 15 is a flowchart illustrating a process of node equipment that has received a request to provision a protection channel.

FIG. 15 is a flowchart illustrating a process executed by node equipment that has received a request to configure a protection channel. The process of this flowchart is executed by the controller 6 in the node equipment that has received a reserve message for provisioning a protection channel.

In S11, the controller 6 decides whether or not a protection channel corresponding to a data type designated by the reserve message is provisioned. When the corresponding protection channel is not provisioned, the controller 6 configures hardware circuits (the input units 2, the channel switching unit 3, and the output units 4) in S12 so that the protection channel corresponding to the data type designated by the reserve message is provided. Alternatively, when the corresponding protection channel is already provisioned, the controller 6 skips the process of S12. Then, the controller 6 transfers the received reserve message to the next node in S13.

Note that, however, the switch node equipment and the end point node equipment may reconfigure circuits for selecting a received signal as occasion demands. Here, in this example, the "switch node equipment" represents node equipment provided in a node to which signals are input via a plurality of channels. For example, when a data signal is transmitted from the node A to the node D and a data signal is transmitted from the node H to the node K, the node equipment E operates as switch node equipment. In this case, in the signaling illustrated in FIG. 14, the node equipment E configures the hardware circuit (channel switching unit 3) so that the data signal received from either of the nodes A and H is selected from among the data signal received from the node A and the data signal received from the node H. Moreover, the node equipment D that operates as the endpoint node equipment configures the hardware circuit (the channel switching unit 3) so that the signal received from the node G is selected.

As described above, in Shared Mesh Protection implemented with the protection channel provisioning method according to the embodiment, hardware circuits of node equipment on a route where a protection channel is provisioned are configured in advance to be a state where a data signal of corresponding work channel can be transmitted when a failure occurs on the work channel. In the meantime, with the method illustrated in FIG. 6, the hardware circuits of each node equipment are configured after a failure occurs on the work channel. Accordingly, comparing with the method illustrated in FIG. 6, the length of time needed from when a failure occurs until a data transmission is recovered is reduced with the protection channel provisioning method according to the embodiment. Namely, the length of time needed for switching from a work channel to a protection channel is reduced with the protection channel provisioning method according to the embodiment.

<Misconnection>

With the protection channel provisioning method according to the embodiment, a shared protection channel shared by a plurality of work channels is provisioned as described above. For instance, in the examples illustrated in FIGS. 13 and 14, a shared protection channel shared by the work channel A-D and the work channel H-K is provisioned on the route EFG. In this case, the shared protection channel transmits the data signal of the work channel A-D or that of the work channel H-K.

Figure 16A:
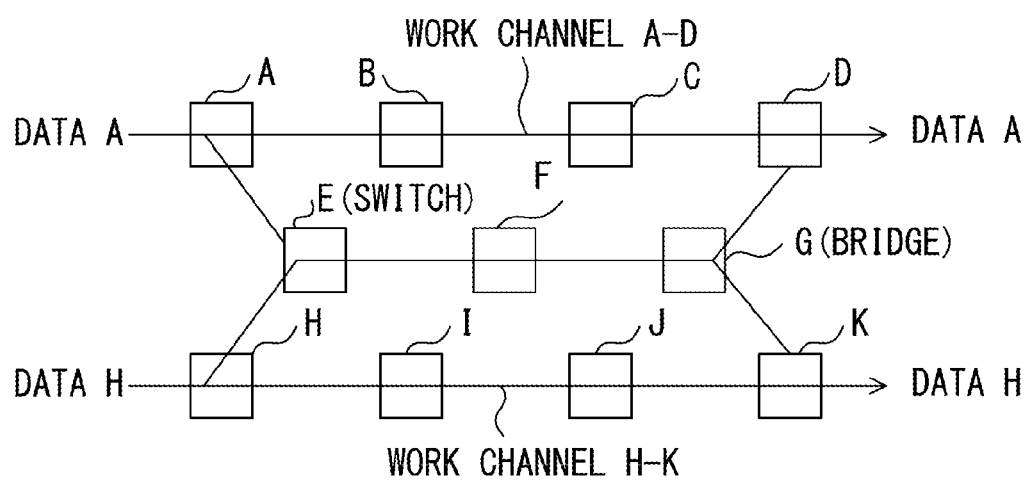
FIGS. 16A and 16B illustrate an example of a misconnection.

In an example illustrated in FIG. 16A, a data signal A is transmitted from the node A to the node D via the work channel A-D, and a data signal H is transmitted from the node H to the node K via the work channel H-K. The node equipment E that operates as switch node equipment receives the data signal A and the data signal H, and selects the data signal H from among the data signals A and H. Accordingly, the data signal H is transmitted from the node E to the node G via the shared protection channel. Moreover, the node equipment G that operates as bridge node equipment transfers, to the node D and the node K, the data signal H that is received via the shared protection channel. Note that, when a failure does not occur, the node equipment D selects the data signal A that is transmitted via the work channel A-D and guides the selected signal to a corresponding client, and the node equipment K selects the data signal H that is transmitted via the work channel H-K and guides the selected signal to a corresponding client.

The "bridge node equipment (or branch node equipment) represents node equipment provided in a node that branches an input channel and guides the branched channels to a plurality of nodes. In this example, however, the "bridge node equipment" represents node equipment that is provided in a node that branches a shared protection channel and guides the branched channels to a plurality of nodes. For example, in FIG. 16A, the shared protection channel is branched by the node G, and guided to the node D corresponding to the protection channel A-D, and the node K corresponding to the protection channel H-K. Accordingly, in this case, the node equipment G operates as bridge node equipment.

Figure 16B:
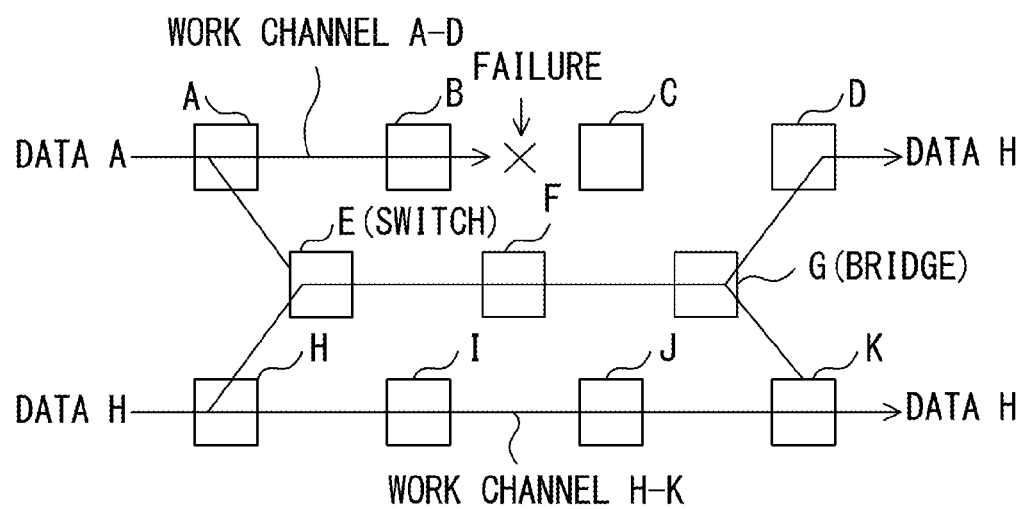

Assume that a failure occurs on the work channel A-D as illustrated in FIG. 16B in the above described operating environment. The node equipments A and D respectively detect the failure. Then, for example, the node equipment A starts signaling for enabling the protection channel corresponding to the work channel A-D. Namely, the node equipment A starts the signaling for using the shared protection channel provisioned on the route EFG as a protection channel for transmitting the data signal of the work channel A-D.

However, in a network system where a protection channel is provisioned with the protection channel provisioning method according to the embodiment, a data signal of any one of work channels flows via the protection channel as described above. Accordingly, an erroneous signal is possibly guided to a client for a duration from when a failure occurs until switching from the work channel to the protection channel is complete.

In the example illustrated in FIG. 16B, the data signal H is being transmitted to the node D via the nodes E, F and G when the failure occurs. Accordingly, the data signal H may be guided to a client connected to the node D for a duration until switching from the work channel to the protection channel is complete. Moreover, the node equipment can automatically make switching from the work channel to the protection channel when a reception level of the work channel drops below a threshold level. In this case, for example, the node equipment D illustrated in FIG. 16B immediately guides the data signal H received from the node equipment G to the corresponding client upon detection of the failure on the work channel A-D.

As described above, in a network system where a protection channel is provisioned with the protection channel provisioning method according to the embodiment, a data signal is possibly transmitted to an unexpected destination when a failure occurs. Such a state is hereinafter referred to a "misconnection" in some cases. The protection channel provisioning method according to the embodiment provides a misconnection avoiding method.

FIGS. 17A to 17C illustrate an example of the misconnection avoiding method. With this method, bridge node equipment transmits a dummy signal via a protection channel at normal operations. Namely, as illustrated in FIG. 17A, the node equipment G transmits a dummy signal to the node D and the node K.

Here, an operation that the node equipment G performs to generate and output a dummy signal is described with reference to FIG. 10. The following explanation assumes that a signal transmitted from the node F is terminated by the input unit 2a. Also assume that signals output from the output units 4a and 4b are respectively guided to the nodes D and K. In this case, a path is provided between the input units 2a and each of the output units 4a, 4b according to an instruction issued from the controller 6. Accordingly, in the node equipment G, the signal received from the node F (the data signal H in FIG. 17A) is guided by the channel switching unit 3 to the output units 4a and 4b.

However, the node equipment G operates as bridge node equipment. Here, the controller 6 can decide that the node equipment is bridge node equipment, for example, when one data signal is transmitted to a plurality of adjacent nodes via a plurality of output units 4. Accordingly, in this case, the controller 6 causes the signal processor 5 of each of the output units 4 coupled to corresponding output protection channels to generate a dummy signal. Namely, in each of the output units 4a, 4b, the signal processor 5 discards the received signal, and outputs the dummy signal. As a result, the dummy signal is transmitted from the node equipment G to the nodes D and K.

The dummy signal means a "signal different from a received signal" in this embodiment. In the example illustrated in FIG. 17A, a signal different from the data signal H is generated as a dummy signal in the node equipment G. The dummy signal is implemented, for example, with a specified test pattern signal, an all-0 signal where all bits indicate "0", and an all-1 signal where all bits indicate "1", or a PRBS (Pseudorandom Binary Sequence) signal.

Assume that a failure occurs on the work channel A-D in the network system illustrated in FIG. 17A. In this case, the node equipment A and the node equipment D respectively detect the failure. Then, in this example, the node equipment D makes switching from the work channel to the protection channel as illustrated in FIG. 17B. Namely, the node equipment D selects the signal received from the node G, and guides the selected signal to the corresponding client. However, the node equipment D is receiving the dummy signal from the node G at this time. Accordingly, when switching from the work channel to the protection channel is performed in the node equipment D, the data signal H is not guided to the client connected to the node D. Namely, a misconnection with which the data signal is transmitted to the unexpected destination is avoided.

The node equipment A starts signaling for switching from the work channel to the protection channel (namely, the signaling for using the shared protection channel provisioned on the route EFG as a protection channel for recovering the work channel A-D). With this signaling, the node equipment E, which operates as switch node equipment, selects the data signal A received from the node A as illustrated in FIG. 17C. Moreover, the node equipment G guides the data signal A transmitted via the protection channel to the nodes D and K. As a result, the node equipment D can transmit the data signal A to the corresponding client. Namely, a data transmission between the nodes A and D is recovered.

In the switching from the work channel to the protection channel, the bridge node equipment may transmit a corresponding data signal to the protection channel that recovers the failed work channel, and may also transmit a dummy signal to other protection channels. That is to say, in the example illustrated in FIGS. 17A to 17C, the node equipment G may guide the data signal A received from the shared protection channel only to the node D, and may transmit the dummy signal to the node K when the work channel A-D is failed.

Moreover, in the switching from the work channel to the protection channel, it is preferable that bridge node equipment stops the dummy signal after the switching process is completed by switch node equipment. That is to say, in the example illustrated in FIGS. 17A to 17C, it is preferable that the node equipment G stops the dummy signal after the node equipment E selects the data signal A. To realize this operation, the node equipment G stops the dummy signal after a specified length of time elapses, for example, from a transfer of a reserve message when the reserve message is transferred from the node D to the node A via the nodes G, F and E.

Figure 18A:
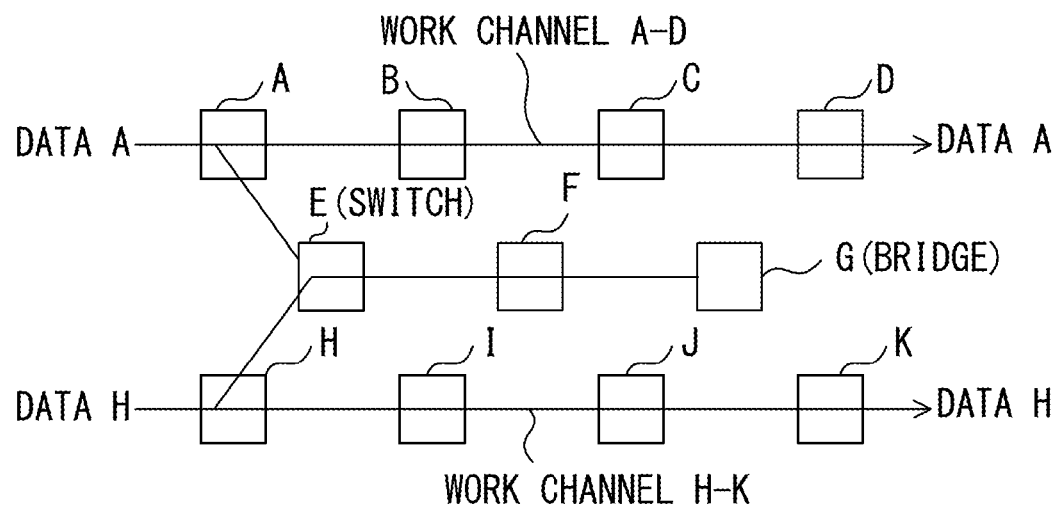
Figure 18C:
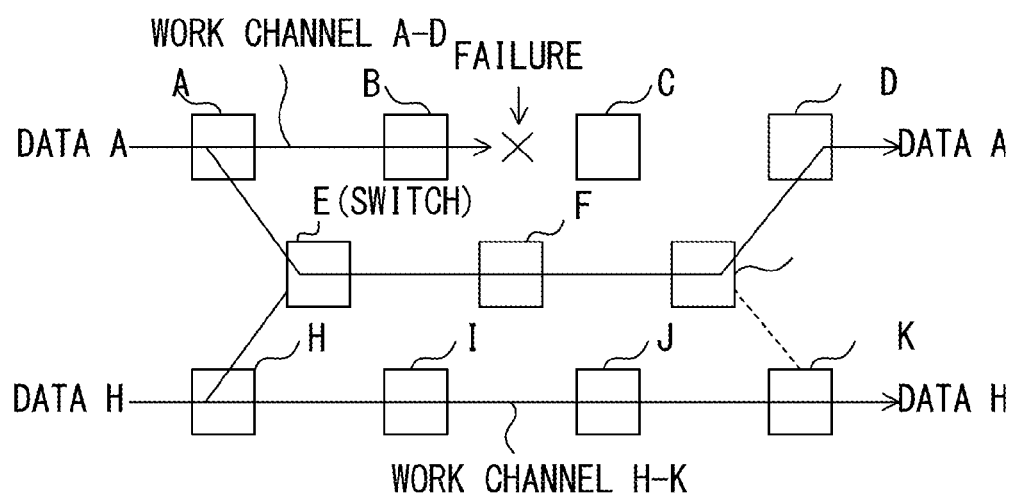

FIGS. 18A to 18C illustrate another example of the misconnection avoiding method. According to the method illustrated in FIGS. 18A to 18C, the bridge node equipment does not configure an output protection channel. Namely, as illustrated in FIG. 18A, the node equipment G does not configure a channel for transmitting a signal from the node G to the node D. Moreover, the node equipment G does not configure a channel for transmitting a signal from the node G to the node K. This state is realized, for example, in a way such that the controller 6 stops an output of the corresponding output unit 4 in the bridge node equipment.

Assume that a failure occurs on the work channel A-D in the network system illustrated in FIG. 18A. In this case, the node equipment A and the node equipment D respectively detect the failure. Then, the node equipment D makes switching from the work channel to the protection channel in this example. Namely, the node equipment D attempts to select a channel for transmitting the signal from the node G to the node D. At this time, however, the channel for transmitting the signal from the node G to the node D is not configured as illustrated in FIG. 18B. Accordingly, even though the node equipment D makes switching from the work channel to the protection channel, the data signal H is not guided to the client connected to the node D. Namely, a misconnection with which a data signal is transmitted to an unexpected destination is avoided.

In the meantime, the node equipment A starts signaling for switching from the work channel to the protection channel in a similar manner as in the case illustrated in FIGS. 17A to 17C. According to this signaling, the node equipment E selects the data signal A received from the node A as illustrated in FIG. 18C. Moreover, the node equipment G configures the channel between the nodes G and D, and guides the data signal A transmitted via the protection channel to the node D. As a result, the node equipment D can transmit the data signal A to the corresponding client. Namely, the data transmission between the nodes A and D is recovered. Note that the node equipment G may or may not configure the channel between the nodes G and K.

As described above, the protection channel provisioning method according to the embodiment may include the procedures for configuring circuits of branch node equipment so that a data signal transmitted via a shared protection channel is not guided to a node on a work channel. Accordingly, a misconnection is avoided by the protection channel provisioning method according to the embodiment.

Note that a misconnection may be caused by a factor that is not derived from a failure on a work channel. Assume that the work channel A-D (the channel for transmitting a data signal between the node A and the node D via the nodes B and C), and the protection channel A-D (the channel for transmitting the data signal between the node A and the node D via the nodes E, F and G) are configured as illustrated in FIG. 19A. Also assume that the protection channel H-K (the channel for transmitting a data signal between the node H and the node K via the nodes E, F and G) is provisioned before the work channel H-K (the channel for transmitting a data signal between the node H and the node K via the nodes I and J) is configured. In this case, when the node equipment E is configured to select the data signal A transmitted from the node A, the node equipment K guides the data signal A to the client connected to the node K. Also when the node equipment K selects not the work channel but the protection channel due to an erroneous configuration, the node equipment K guides the data signal A to the client connected to the node K as illustrated in FIG. 19B.

Also in these cases, the procedures illustrated in FIGS. 17A to 17C or FIGS. 18A to 18C are effective. Namely, with the protection channel provisioning method according to the embodiment, not only a misconnection caused by a failure on a work channel but a misconnection caused by any factor (such as the case illustrated in FIG. 19A or 19B) can be avoided.

First Embodiment

In a first embodiment, a network system is configured with the method illustrated in FIGS. 17A to 17C. Namely, a misconnection is avoided by using a dummy signal in the first embodiment.

Figure 20:
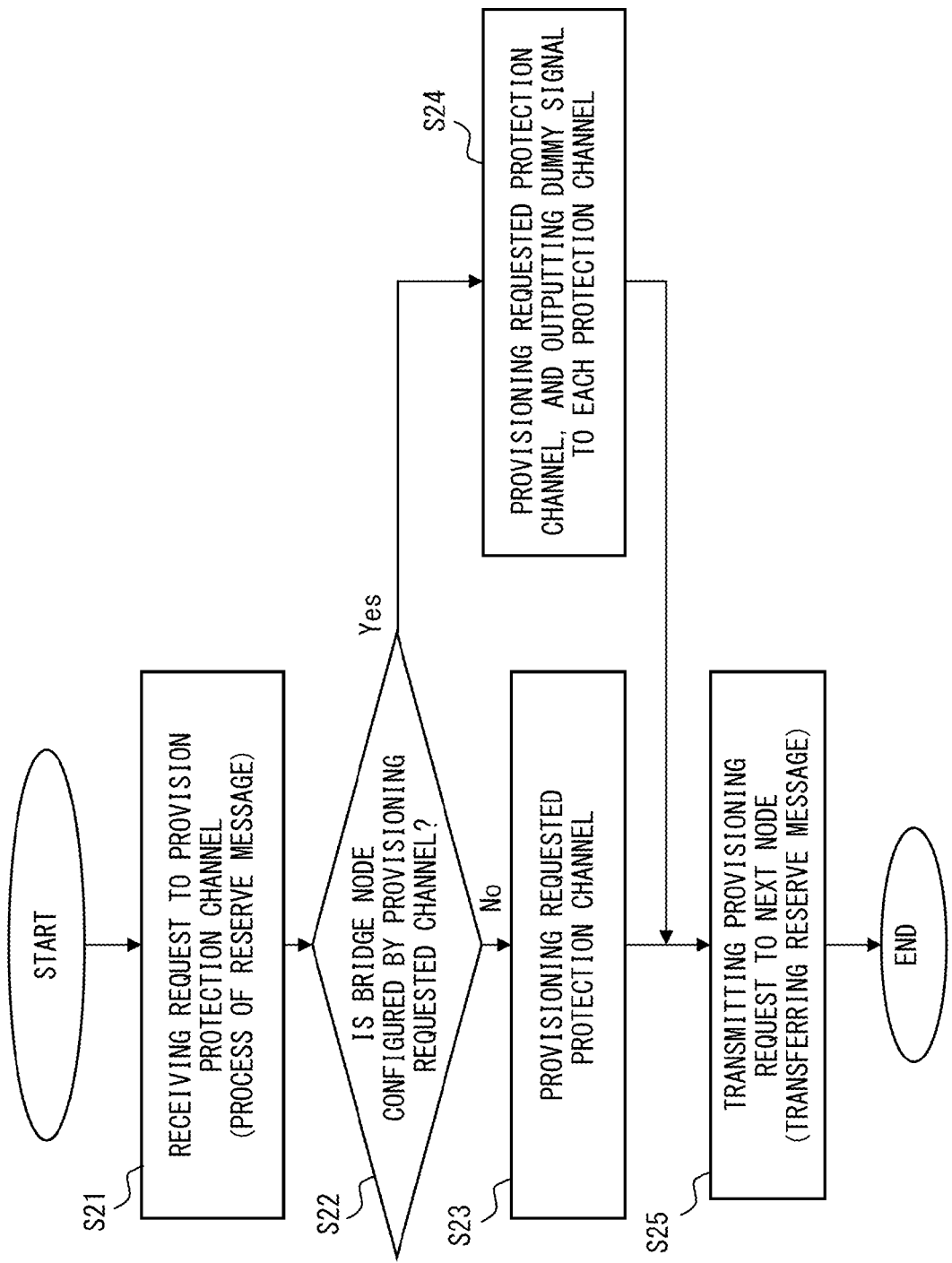
FIG. 20 is a flowchart illustrating operations of node equipment that has received a request to provision a protection channel in a first embodiment.

FIG. 20 is a flowchart illustrating operations of node equipment that has received a request to provision a protection channel. This request is implemented, for example, with a reserve message of RSVP-TE. The following explanation refers to the operations of the node equipment that has received a reserve message for making a request to provision a protection channel.

In S21, the controller 6 receives the reserve message for making a request to provision a protection channel. In an endpoint node of a path message, the controller 6 generates the reserve message for making a request to provision a protection channel.

In S22, the controller 6 decides whether or not the request implemented with the reserve message is a trigger for configuring a bridge node. Namely, the controller 6 decides whether or not a configuration where one input channel is guided to a plurality of output channels is realized by provisioning the channel requested by the reserve message.

When the request implemented with the reserve message does not configure the bridge node, the controller 6 provisions the requested protection channel in S23. In the meantime, when the request implemented with the reserve message configures the bridge node, the controller 6 provisions the requested protection channel, and outputs a dummy signal via each of the protection channels. Hereafter, the controller 6 transfers the received reserve message to the next node in S25.

FIG. 21 is a flowchart illustrating operations of node equipment that has received a request to release a provisioned protection channel in the first embodiment. This request is implemented, for example, with a reserve message of RSVP-TE. The following explanation refers to the operations of the node equipment that has received the reserve message for making a request to release the protection channel.

In S31, the controller 6 receives the reserve message for making a request to release the protection channel. In an endpoint node of a path message, the controller 6 generates the reserve message for making a request to release the protection channel.

In S32, the controller 6 decides whether or not the request transmitted by the reserve message is a trigger for changing a bridge node to a non-bridge node. Namely, the controller 6 decides whether or not a configuration where one input channel is guided to a plurality of output channels disappears by releasing the channel requested by the reserve message.

When the node is a non-bridge node or when the request transmitted with the reserve message does not change the bridge node to the non-bridge node, the controller 6 releases the requested protection channel in S33. In contrast, when the request transmitted with the reserve message changes the bridge node to the non-bridge node, the controller 6 releases the requested protection channel and stops the dummy signal of each of the protection channels in S34. Hereafter, the controller 6 transfers the received reserve message to the next node in S35.

Figure 22:
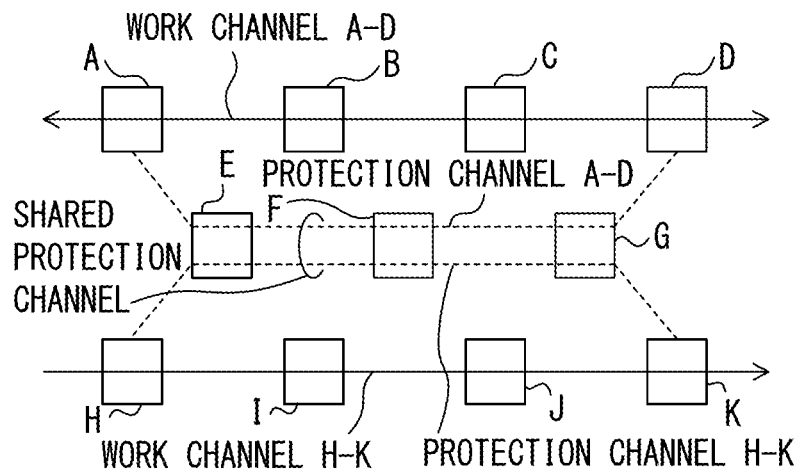
FIG. 22 illustrates an example of a network system where work channels and protection channels are configured.

An example of a method for provisioning a protection channel in the first embodiment will be described. Here, assume that the work channel A-D and the work channel H-K, which are illustrated in FIG. 22, are already configured. Also assume that the protection channel A-D corresponding to the work channel A-D and the protection channel H-K corresponding to the work channel H-K are reserved. On a route (shared route) where the protection channel A-D and the protection channel H-K are redundantly reserved, a shared protection channel is provisioned. The shared protection channel can transmit a signal as the protection channel A-D or as the protection channel H-K. Namely, when the shared protection channel is used as the protection channel A-D, the shared protection channel transmits the data signal of the work channel A-D. In the meantime, when the shared protection channel is used as the protection channel H-K, the shared protection channel transmits the data signal of the work channel H-K. Assume that each of the channels bidirectionally transmits a signal.

The following example assumes that signaling for provisioning the protection channel A-D is performed and signaling for provisioning the protection channel H-K is performed thereafter. The signaling includes the above described path message and reserve message. Upon receipt of the path message, each of the node equipments decides whether or not the node equipment can provide resources requested by the path message. When the node equipment cannot provide the requested resources, the node equipment returns an error message. However, the following description assumes that each of the node equipments can provide the resources requested by the path message.

The node equipment A generates a path message for provisioning the protection channel A-D. At this time, the node equipment A reserves the resources for the protection channel A-D. Then, the node equipment A transmits the path message to the node E. The node equipment E reserves the resources based on the received path message, and transfers the path message to the node F. The node equipment F reserves the resources based on the received path message, and transfers the path message to the node G. The node equipment G reserves the resources based on the received path message, and transfers the path message to the node D.

The node equipment D reserves the resources based on the received path message. Here, the node D is an endpoint node of this path message. Accordingly, the node equipment D generates a reserve message corresponding to the received path message, and enables the reserved resources in the node equipment D. At this time, when the protection channel A-D is provisioned in the node equipment D, the node equipment D starts to transmit the same signal (namely, the data signal addressed to the node A) via the two channels (the work channel A-D and the protection channel A-D). Namely, the node equipment D starts to operate as bridge node equipment at a timing when the protection channel A-D is provisioned in the node equipment D.

Accordingly, the node equipment D transmits a dummy signal via the protection channel in S24 of FIG. 20. Namely, the node equipment D transmits the dummy signal to the node G. Moreover, the node equipment D transmits the generated reserve message to the node G.

The node equipment G enables the resources based on the received reserve message, and transfers the reserve message to the node F. The node equipment F enables the resources based on the received reserve message, and transfers the reserve message to the node E. The node equipment E enables the resources based on the received reserve message, and transfers the reserve message to the node A. Enabling of resources is equivalent to the process for configuring hardware circuits so that a requested data signal is transmitted, as described above. Accordingly, when the reserve message is returned from the node D to the node A, the protection channel for transmitting a signal is provisioned between the nodes A and D via the nodes E, F and G.

The node equipment A enables the resources based on the received reserve message. At this time, when the protection channel A-D is provisioned in the node equipment A, the node equipment A starts to transmit the same signal (namely, the data signal addressed to the node D) via the two channels (the work channel A-D and the protection channel A-D). Namely, the node equipment A starts to operate as bridge node equipment when the protection channel A-D is provisioned in the node equipment A. Accordingly, the node equipment A transmits a dummy signal via the protection channel similarly to the node equipment D. Namely, the node equipment A transmits the dummy signal to the node E.

The node equipment H generates a path message for provisioning the protection channel H-K. An operation for transmitting the path message for provisioning the protection channel H-K from the node H to the node K is substantially the same as that for transmitting a path message for provisioning the protection channel A-D from the node A to the node D. Accordingly, the node equipments H, E, F, G and K respectively reserve the resources for the protection channel H-K.

Similarly to the node equipment D, the node equipment K generates a reserve message corresponding to the received path message, and enables the reserved resources. At this time, when the protection channel H-K is provisioned in the node equipment K, the node equipment K transmits the same signal (namely, the data signal addressed to the node H) via the two channels (the work channel H-K and the protection channel H-K). Namely, the node equipment K starts to operate as bridge node equipment when the protection channel H-K is provisioned in the node equipment K. Accordingly, the node equipment K transmits a dummy signal via the protection channel similarly to the node equipment D. Namely, the node equipment K transmits the dummy signal to the node G.

The reserve message generated by the node equipment K is transmitted to the node H via the nodes G, F and E. At this time, the node equipments G, F, E and H enable the resources reserved in advance. As a result, the protection channel H-K is provisioned. In this example, however, a type of a data signal transmitted between the nodes A and D, and that of a data signal transmitted between the nodes H and K are the same. Namely, the resources for provisioning the protection channel A-D and those for provisioning the protection channel H-K are the same. Accordingly, the state of the channel between the nodes E and G does not vary although the protection channel H-K is provisioned.

However, when the protection channel H-K is provisioned in the node equipment G, the node equipment G starts to transmit a signal (namely, the signal received from the node F) via the two channels (the protection channel A-D and the protection channel H-K). Namely, the node equipment G starts to operate as bridge node equipment when the protection channel H-K is provisioned in the node equipment G. Accordingly, the node equipment G transmits a dummy signal via each of the protection channels. Namely, the node equipment G transmits a dummy signal to the node D and the node K.

Similarly, also the node equipment E transmits a dummy signal to the node A and the node H. Moreover, the node equipment H transmits a dummy signal to the node E similarly to the node equipment K.

Figure 23A:
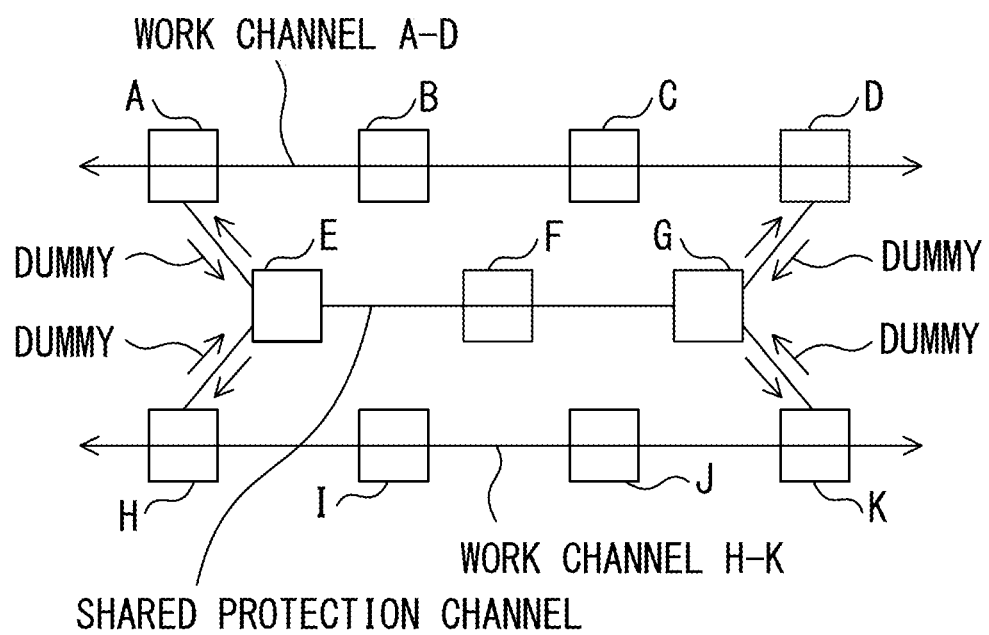
FIGS. 23A and 23B illustrate Shared Mesh Protection in the first embodiment.

FIG. 23A illustrates a state where a protection channel is provisioned in the first embodiment. As described above, a protection channel is provisioned on the shared route (namely, the route EFG). The node equipments A, D, E, G, H and K that operate as bridge node equipment respectively transmit a dummy signal via the protection channel.

Assume that a failure occurs on the work channel A-D between the nodes B and C hereafter. Then, the node equipment A starts signaling for transmitting a data signal by using the protection channel A-D as a replacement for the work channel A-D. Namely, the node equipment A generates a path message for making an instruction to use the protection channel A-D. Note that the instruction to use the protection channel is represented, for example, by state information in the path message.

This path message is transmitted from the node A to the node D via the nodes E, F and G. At this time, each of the node equipments reserves resources after each of the node equipments confirms whether or not the local node equipment can provide the requested resources.

The node equipment D generates a reserve message corresponding to the received path message, and enables the reserved resources. At this time, the node equipment D configures hardware circuits so that a signal transmitted from the node G is received and the transmission signal is guided to the node G in order to use the protection channel A-D. Moreover, the node equipment D stops the operation for transmitting a dummy signal to the protection channel. Namely, the node equipment D stops the operation for transmitting the dummy signal to the node G.

The node equipment G enables the resources according to the reserve message. At this time, the node equipment G configures hardware circuits so that the signal transmitted from the node D is received among signals transmitted from the node D and the node K in order to use the protection channel A-D. Moreover, the node equipment G stops the operation for transmitting a dummy signal to the protection channel A-D. Namely, the node equipment G stops the operation for transmitting the dummy signal to the node D. Note that the node equipment G may or may not stop the operation for transmitting the dummy signal to the node K.

Similarly to the node equipment G, the node equipment E configures hardware circuits so that a signal transmitted from the node A is received among signals transmitted from the node A and the node H in order to use the protection channel A-D. Moreover, the node equipment E stops the operation for transmitting a dummy signal to the protection channel A-D. Namely, the node equipment E stops the operation for transmitting the dummy signal to the node A. Note that the node equipment E may or may not stop the operation for transmitting the dummy signal to the node H.

Similarly to the node equipment D, the node equipment A configures hardware circuits so that a signal transmitted from the node E is received and a transmission signal is guided to the node E in order to use the protection channel A-D. Moreover, the node equipment A stops the operation for transmitting a dummy signal to the node E.

Figure 23B:
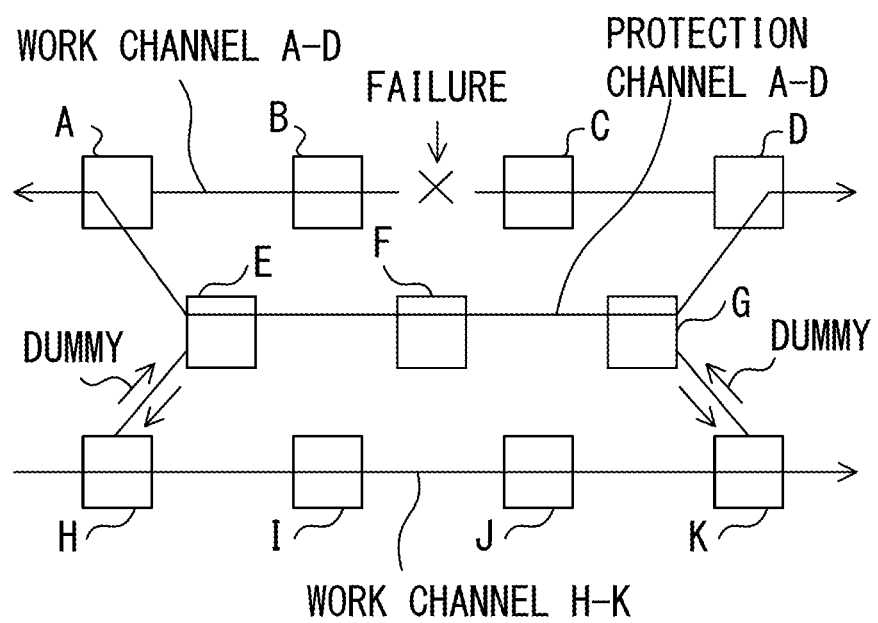

As a result of the above described signaling, the state illustrated in FIG. 23B is achieved. Namely, the data signal between the nodes A and D is transmitted via the protection channel A-D (namely, via the nodes E, F and G).

Second Embodiment

In a second embodiment, a network system is configured with the method illustrated in FIGS. 18A to 18C. Namely, a misconnection is avoided by not provisioning a protection channel in bridge node equipment in the second embodiment.

FIG. 24 is a flowchart illustrating operations of node equipment that has received a request to provision a protection channel. This request is implemented, for example, with a reserve message of RSVP-TE. The following explanation refers to the operations of the node equipment that has received the reserve message for making a request to provision a protection channel.

Processes in S41 to S45 are similar to the processes in S21 to S25 in the first embodiment illustrated in FIG. 21. Namely, S41 to S43 and S45 are substantially the same as S21 to S23 and S25. However, when a request transmitted with the reserve message configures a bridge node ("YES" in S42), the controller 6 configures hardware circuits in S44 so that none of protection channels are provisioned. At this time, if there has been a previously provisioned protection channel, the controller 6 releases the protection channel.

Figure 25:
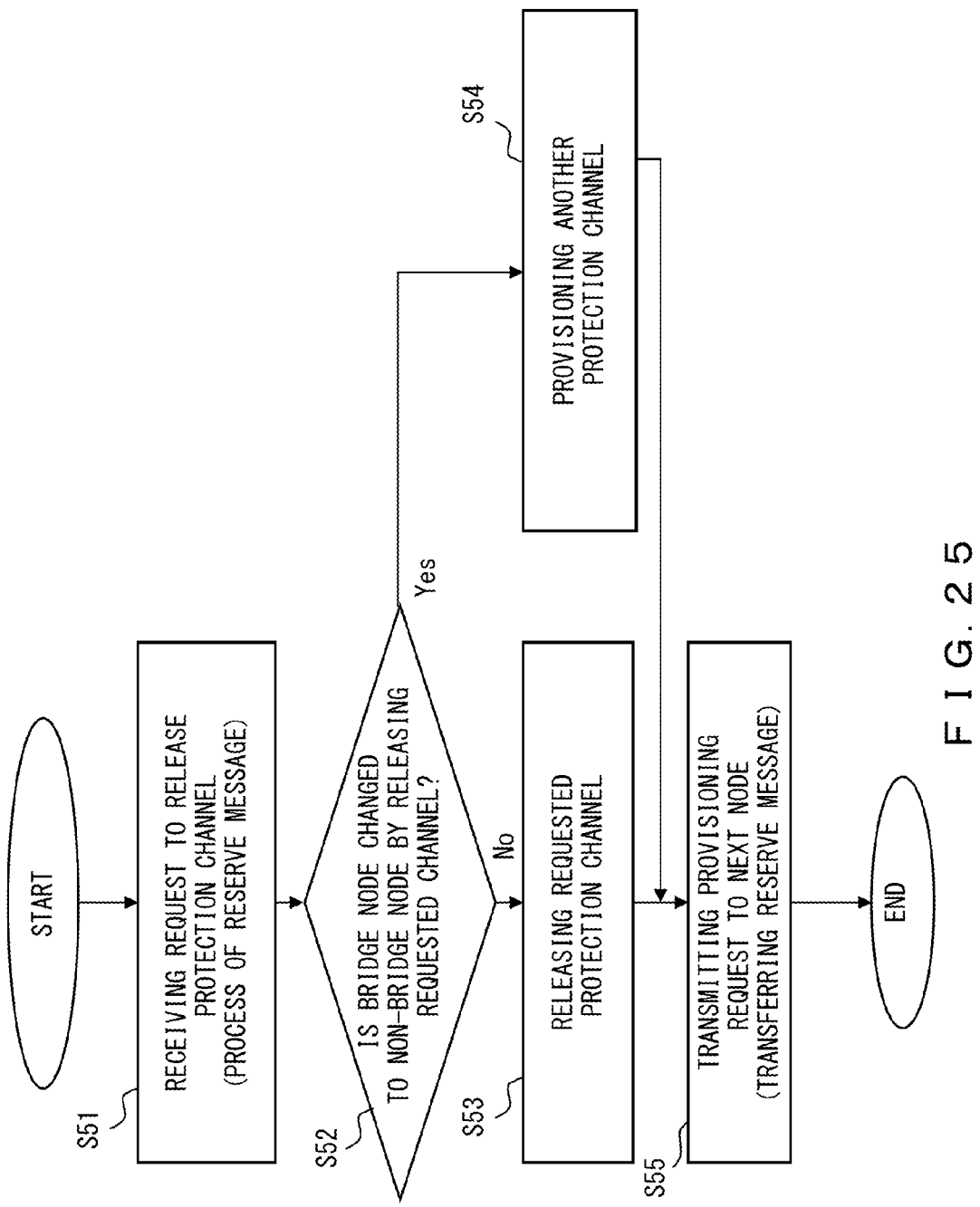
FIG. 25 is a flowchart illustrating operations of node equipment that has received a request to release a provisioned protection channel in the second embodiment.

FIG. 25 is a flowchart illustrating operations of the node equipment that has received a request to release a provisioned protection channel in the second embodiment. This request is implemented, for example, with a reserve message of RSVP-TE. The following explanation refers to the operations of the node equipment that has received the reserve message for making a request to release the protection channel.

Processes in S51 to S55 are similar to the processes in S31 to S35 in the second embodiment illustrated in FIG. 21. Namely, S51 to S53 and S55 are substantially the same as S31 to S33 and S35. However, when the request transmitted with the reserve message changes a bridge node to a non-bridge node ("YES" in S52), the controller 6 provisions a protection channel other than the protection channel requested by the received reserve message.

An example of the method for provisioning a protection channel in the second embodiment is described. Here, assume that the work channel A-D and the work channel H-K, which are illustrated in FIG. 22, are already provisioned in a similar manner as in the explanation of the first embodiment. Also assume that the protection channel A-D corresponding to the work channel A-D and the protection channel H-K corresponding to the work channel H-K are reserved.

In the first embodiment, the node equipments (namely, A, D, E, G, H and K) that operate as bridge node equipment respectively transmit a dummy signal via the protection channel. In the meantime, node equipment that operates as bridge node equipment releases an already provisioned protection channel, and does not provision a new protection channel any more. Namely, in the example illustrated in FIG. 22, the node equipments A, D, E, G, H and K respectively release the previously provisioned protection channel, and do not provision a newly requested protection channel.

Hereafter, when a failure occurs on the work channel A-D, signaling similar to that in the first embodiment is performed. In the second embodiment, however, the node equipments A, D, E and G respectively configure hardware circuits so that a data signal is transmitted via the protection channel A-D. Namely, the channel for transmitting the data signal of the work channel A-D is configured between the nodes A and E and between the nodes G and D. Accordingly, the protection channel A-D for transmitting the data signal between the nodes A and D is configured via the nodes E, F and G.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A protection channel provisioning method used in a network system including a plurality of nodes, the method comprising:
reserving a first protection channel corresponding to a first work channel and a second protection channel corresponding to a second work channel;
provisioning a shared protection channel by configuring a circuit of node equipment provided on a shared route on which the first protection channel and the second protection channel are reserved so that a data signal of the first work channel or a data signal of the second work channel is transmitted via the shared route; and
configuring a circuit of branch node equipment provided in a branch node at which the shared protection channel is guided to a first node corresponding to the first protection channel and a second node corresponding to the second protection channel so that the data signal transmitted via the shared protection channel is not guided to the first node and the second node, wherein
when the data signal of the first work channel is transmitted on the first work channel without fail and the data signal of the second work channel is transmitted on the second work channel without fail, the data signal of the first work channel or the data signal of the second work channel is transmitted via the shared protection channel to the branch node, and the branch node equipment provided in the branch node discards the data signal received via the shared protection channel.

2. A protection channel provisioning method used in a network system including a plurality of nodes, the method comprising:
reserving a first protection channel corresponding to a first work channel and a second protection channel corresponding to a second work channel;
provisioning a shared protection channel by configuring a circuit of node equipment provided on a shared route on which the first protection channel and the second protection channel are reserved so that a data signal of the first work channel or a data signal of the second work channel is transmitted via the shared route; and
configuring a circuit of branch node equipment provided in a branch node at which the shared protection channel is guided to a first node corresponding to the first protection channel and a second node corresponding to the second protection channel so that the data signal transmitted via the shared protection channel is not guided to the first node and the second node, wherein
when a type of the data signal of the first protection channel and a type of the data signal of the second protection channel are the same, the node equipment on the shared route accepts reservations of the first protection channel and the second protection channel and provisions the shared protection channel.

3. A protection channel provisioning method used in a network system including a plurality of nodes, the method comprising:
reserving a first protection channel corresponding to a first work channel and a second protection channel corresponding to a second work channel;
provisioning a shared protection channel by configuring a circuit of node equipment provided on a shared route on which the first protection channel and the second protection channel are reserved so that a data signal of the first work channel or a data signal of the second work channel is transmitted via the shared route; and
configuring a circuit of branch node equipment provided in a branch node at which the shared protection channel is guided to a first node corresponding to the first protection channel and a second node corresponding to the second protection channel so that the data signal transmitted via the shared protection channel is not guided to the first node and the second node, wherein
the branch node equipment transmits a dummy signal, which is different from the data signal received via the shared protection channel, to the first node and the second node, and wherein upon receipt of a request to use the shared protection channel for the first work channel, the branch node equipment stops a transmission of the dummy signal to the first node and guides the data signal received via the shared protection channel to the first node.

4. The protection channel provisioning method according to claim 1, wherein
the branch node equipment does not provision a channel between the branch node and the first node and between the branch node and the second node.

5. The protection channel provisioning method according to claim 4, wherein
upon receipt of a request to use the shared protection channel for the first work channel, the branch node equipment provisions a channel between the branch node and the first node and guides the data signal received via the shared protection channel to the first node.

6. Node equipment used in a network system including a plurality of nodes, the node equipment comprising:
an input unit configured to process a signal received from an adjacent node;
an output unit configured to process a signal transmitted to an adjacent node; and
a controller configured to control the input unit and the output unit, wherein
upon receipt of a request to provision a first protection channel for transferring a data signal from a first node to a second node and a request to provision a second protection channel for transferring the data signal from the first node to a third node, the controller configures the output unit so that the data signal from the first node is not transmitted to the second node and the third node, wherein
the controller configures the output unit so as to transmit a dummy signal, which is different from the data signal from the first node, to the second node and the third node, and wherein
upon receipt of a request to use the first protection channel, the controller configures the output unit so as to stop a transmission of the dummy signal to the second node and guide the data signal from the first node to the second node.

7. A protection channel provisioning method used in a network system including a plurality of nodes, the method comprising:
reserving resources for a first protection channel corresponding to a first work channel in node equipment on a route of the first protection channel according to a type of a data signal transmitted in the first work channel;
reserving resources for a second protection channel corresponding to a second work channel in the node equipment according to a type of a data signal transmitted in the second work channel when a data signal of the second protection channel passes through the node equipment and when the type of the data signal transmitted in the first work channel is same as the type of the data signal transmitted in the second work channel; and
configuring a circuit in the node equipment according to the reserved resources for the first protection channel or the reserved resources for the second protection channel.

\* \* \* \* \*